US006996780B2

(12) United States Patent
Estrada

(10) Patent No.: US 6,996,780 B2
(45) Date of Patent: Feb. 7, 2006

(54) METHOD AND SYSTEM FOR CREATING A PLACE TYPE TO BE USED AS A TEMPLATE FOR OTHER PLACES

(75) Inventor: Julio Estrada, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 09/752,942

(22) Filed: Dec. 29, 2000

(65) Prior Publication Data

US 2004/0070609 A1 Apr. 15, 2004

(51) Int. Cl.
*G06F 3/00* (2006.01)

(52) U.S. Cl. ...................... 715/751; 715/760; 715/733; 715/744; 715/748

(58) Field of Classification Search ................ 345/733, 345/744, 751, 760, 764, 765; 709/221, 223, 709/224; 715/733, 744, 751, 748, 749, 752, 715/764, 765, 760, 513
See application file for complete search history.

(56) References Cited

U.S. PATENT DOCUMENTS 5,894,554 A 4/1999 Lowery et al. ........ 395/200.33
6,052,730 A 4/2000 Felciano et al. ............ 709/225
6,070,185 A 5/2000 Anupam et al. ............ 709/204
6,081,788 A 6/2000 Appleman et al. ............ 705/14
6,151,020 A * 11/2000 Palmer et al. ............. 345/733
6,230,185 B1 * 5/2001 Salas et al. ................. 709/205
6,233,600 B1 * 5/2001 Salas et al. ................. 709/201
6,278,449 B1 8/2001 Sugiarto et al. ............ 345/334
6,314,408 B1 * 11/2001 Salas et al. .................... 705/54
6,317,777 B1 11/2001 Skarbo et al. .............. 709/204
6,401,085 B1 * 6/2002 Gershman et al. ............. 707/4

* cited by examiner

*Primary Examiner*—John Cabeca
*Assistant Examiner*—Kieu D. Vu
(74) *Attorney, Agent, or Firm*—Stephen T. Keohane; Shelley M. Beckstrand

(57) ABSTRACT

Collaboration space object model provides for a place consisting of rooms created by users interacting with a client browser. A skin (i.e., theme) may be used as template for creating places. PlaceBots (i.e., agents) provide for accessing, processing and managing data in a place. HTML may be dragged and dropped into a place, where it is parsed and corresponding place fields created. A place type comprising a template of an entire place, or collaboration space, may be used to create new places. Changes made to a place may be reported, subject to security controls, by selecting what's new.

19 Claims, 13 Drawing Sheets

METHOD AND SYSTEM FOR CREATING A PLACE TYPE TO BE USED AS A TEMPLATE FOR OTHER PLACES

CROSS REFERENCES TO RELATED APPLICATIONS

The following U.S. patent applications, filed concurrently herewith, are assigned to the same assignee hereof and contain subject matter related to the subject matter of the present application:

U.S. patent application Ser. No. 09/752,120 filed 29 Dec. 2000, entitled "Method and System for Creating a Theme of a Place to be Used as a Template for Other Places";

U.S. patent application Ser. No. 09/752,115 filed 29 Dec. 2000, entitled "Method and System for Automatically Accessing, Processing, and Managing the Data In a Place";

U.S. patent application Ser. No. 09/752,121 filed 29 Dec. 2000, entitled "Method and System for Importing HTML Forms";

U.S. patent application Ser. No. 09/752,172 filed 29 Dec. 2000, entitled "Method and System for Importing MS Office Forms";

U.S. patent application Ser. No. 09/752,934 filed 29 Dec. 2000, entitled "Method and System for Identifying and Displaying Information That Is New or Has Been Updated In a Place";

U.S. patent application Ser. No. 09/752,961 filed 29 Dec. 2000, entitled "Method and System for Providing Task Information in a Place";

U.S. patent application Ser. No. 09/752,745 filed 29 Dec. 2000, entitled "Method and System for Providing Synchronous Communication and Person Awareness In a Place";

U.S. patent application Ser. No. 09/752,962 filed 29 Dec. 2000, entitled "Method and System for Providing a Separate Browser Window With Information From the Main Window In a Simpler Format";

U.S. patent application Ser. No. 09/752,935 filed 29 Dec. 2000, entitled "Method and System for Allowing In Place Editing of Office Documents In a Place".

The present application is also an improvement upon the following copending, previously filed applications, assigned to the same assignee:

Ser. No. 09/473,745 filed 28 Dec. 1999, entitled "System and Method for Interconnecting Secure Rooms";

Ser. No. 09/473,630 filed 28 Dec. 1999, entitled "System and Method for Dynamic Management of Web Site";

Ser. No. 09/473,640 filed 28 Dec. 1999, entitled "System and Method for Presentation of Room Navigation";

Ser. No. 09/473,098 filed 28 Dec. 1999, entitled "System and Method for Independent Room Security Management";

Ser. No. 09/477,477 filed 4 Jan. 2000, entitled "System and Method for Dynamically Generating Viewable Graphics";

Ser. No. 09/477,471 filed 4 Jan. 2000, entitled "System and Method for Dynamic Browser Management of Web Site";

Ser. No. 09/477,474 filed 4 Jan. 2000, entitled "System and Method for Room Decoration and Inheritance";

Ser. No. 09/477,469 filed 4 Jan. 2000, entitled "System and Method for Online/Offline Uninterrupted Updating of Rooms in Collaboration Space";

Ser. No. 09/477,473 filed 4 Jan. 2000, entitled "System and Method for Client Replication of Collaboration Space";

Ser. No. 09/477,476 filed 4 Jan. 2000, entitled "System and Method for Browser Creation and Maintenance of Forms";

Ser. No. 09/478,238 filed 4 Jan. 20001, entitled "System and Method for Browser Definition of Workflow Documents".

The above-identified patent applications are incorporated herein by reference.

BACKGROUND OF THE INVENTION

1. Technical Field of the Invention

This invention relates to web technology. More particularly, it relates to the creation and use of collaboration sites on the Internet or on an Intranet client/server system and to the graphical user interface used in Internet communications.

2. Background Art

The Internet and the World Wide Web (WWW) provide intra-enterprise connectivity, inter-enterprise connectivity and application hosting on a larger scale than ever before. By exploiting the broadly available and deployed standards of the Internet and the WWW, system users and designers can leverage a single architecture to build client/server applications for internal use that can reach outside to customers, business partners and suppliers.

Collaboration requires simultaneous communication between individuals on a project team. Typically, this has required that the team members work in the same location. Phone and video conferencing has enabled some remote work on the part of team members. Also, because of the growth of the Internet, collaboration using web technologies has been attempted, primarily using electronic mail (E-mail), Internet chat rooms, electronic whiteboards, and conferencing software. The most useful has been E-mail, but this approach results in a large trail or thread of notes as collaboration on a project advances, and these notes have no home or place to reside which is accessible by all team members substantially instantaneously and simultaneously. People often enter such a thread at different points, and such threads are not efficient in coordinating the work of many different people on a team which may include in-house developers and others, such as remote contractors, outside of an enterprise's firewall.

In order for such disperse teams to have the same, or substantially the same, collaboration environment as individuals working in the same physical office, a system is required which facilitates instant messaging, voice conferencing, electronic white boarding, and text and non-text file exchange. Such a system needs to provide a collaborative electronic room, or space, which is easily configured for use by team members without substantial administrative or application development support, and preferably include both groupware and project oriented applications such as shared folders, file exchange, workflow, group calendars, threaded conversations, version control, file locking, file merging, and security.

There is a need in the art for such a system which is easy to set up and which enables diverse and remote teams to become immediately productive in a secure environment. It would be, further, most desirable to allow such a collaborative environment to be set up without administrative support, that is by members of the team itself, using a familiar and easy to use browser user interface. Members of the team, acting with manager or author authority, and using such a browser interface without involving administrative or application development support, need to be able to set up a folder or room for each project element, such as a source code component, with version control, workflow elements, and group calendaring for tracking the project or project element with respect to approvals and deadlines. Such a room needs to receive from team members reports and have them routed to appropriate team members for review, resolution, and approval.

The WWW is a collection of servers on an IP (Internet Protocol) network, such as the Internet, an Intranet or an Extranet, that utilize the Hypertext Transfer Protocol (HTTP). Hereinafter, "Internet" 100 will be used to refer to any IP network.

HTTP is a known application protocol that provides users with access to files, which can be in different formats, such as text, graphics, images, sound, and video, using a standard page description language known as Hypertext Markup Language (HTML). Among a number of basic document formatting functions, HTML allows software developers to specify graphical pointers on displayed web pages, commonly referred to as "hyperlinks," that point to other web pages resident on remote servers. Hyperlinks commonly are displayed as highlighted text or other graphical image on the web page. Selection of a hyperlink with a pointing device, such as a computer mouse, causes the local computer to download the HTML associated with the web page from a remote server. The browser then renders the HTML into the displayed web page.

Web pages accessed over the Internet, whether by a hyperlink, opening directly via an "open" button in the browser, or some other means, are commonly downloaded into the volatile cache of a local computer system. In a computer system, for example, the volatile cache is a high-speed buffer that temporarily stores web pages from accessed remote web sites. The volatile cache thus enables a user to quickly review web pages that were already downloaded, thereby eliminating the need to repeat the relatively slow process of traversing the Internet to access previously viewed web pages. This is called local caching.

It is an object of the invention to provide a collaboration space application model for creating web applications that are aesthetically pleasing and present the user with a simple interface.

It is a further object of the invention to provide for creating web applications that are instantly created, instantly archived, team and project oriented, easy to use, created, accessed and administered via the Web, reusable, and extensible.

It is a further object of the invention to provide a method and system for creating a place in collaboration space by creating a first place; and saving the first place as a place type template from which other places may be created in collaboration space having the same look and feel.

SUMMARY OF THE INVENTION

A method and system is provided for creating a place in collaboration space by creating a first place; and saving the first place as a place type template from which other places may be created in the collaboration space.

In accordance with an aspect of the invention, there is provided a computer program product or computer program element for creating a place in collaboration space by creating a first place; and saving said first place as a place type template from which other places may be created in said collaboration space.

Other features and advantages of this invention will become apparent from the following detailed description of the presently preferred embodiment of the invention, taken in conjunction with the accompanying drawings.

BEST MODE FOR CARRYING OUT THE INVENTION

Architecture Overview

Figure 1:
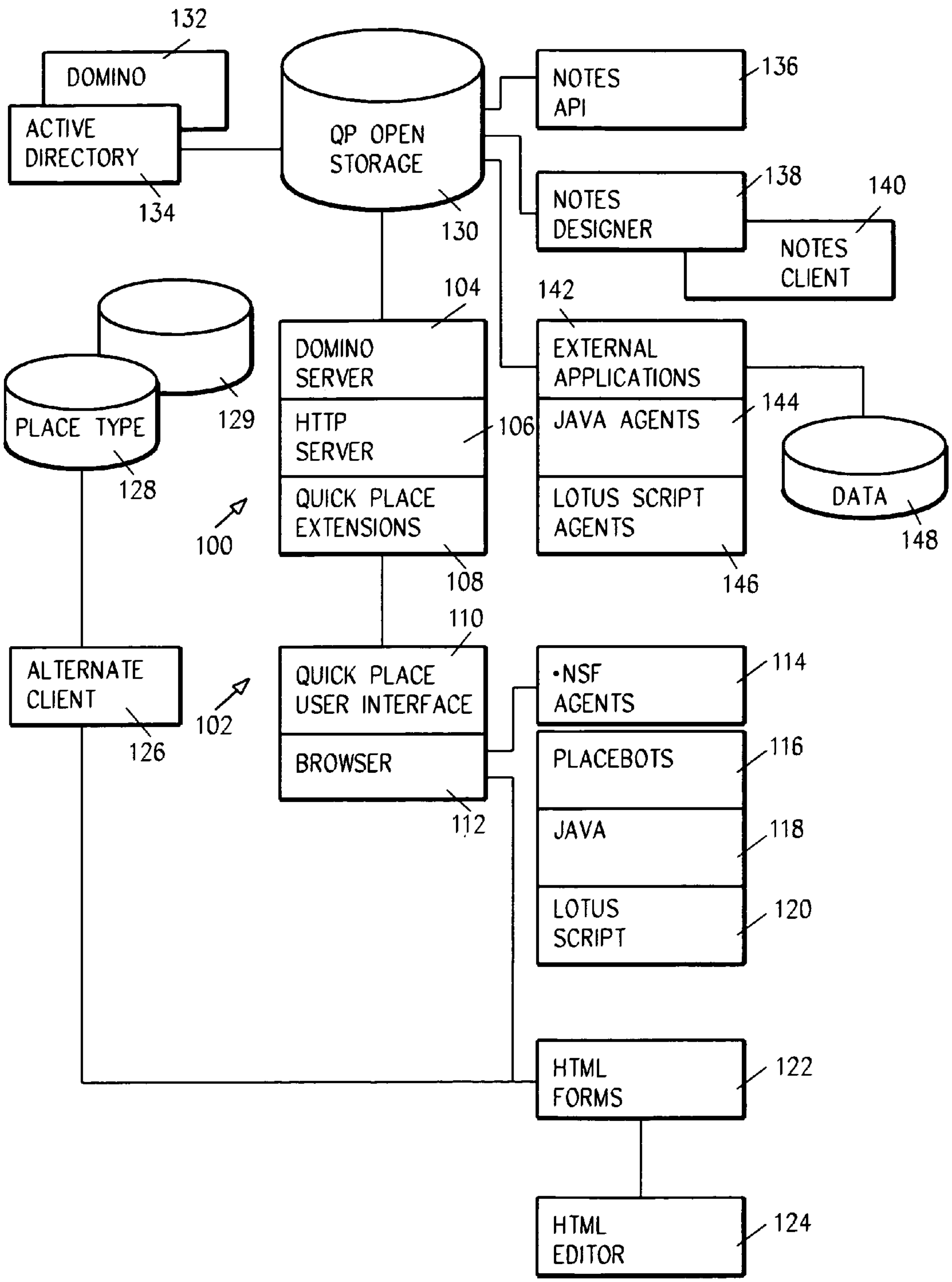
FIG. 1 is a schematic representation of a typical server/client system implementing the collaboration space of the preferred embodiments of the invention.

Referring to FIG. 1, a broad overview of a system implementing the collaboration space technology of an exemplary embodiment of the system of the invention is presented.

Server 100 includes a Domino server 104, HTTP server 106, QuickPlace extensions 108, and open storage 130. Client 102 includes a QuickPlace user interface 110 and browser 112.

QuickPlace open storage 130 includes all the databases and templates that implement the collaboration space. Domino 132 and active directory 134 define the collaboration process. The user interfaces with the system through browser 112. NSF agents 114, 116, Java 118 and LotusScript 120 represent components and templates downloaded from server 100 in support of collaboration space at client 102. All the extensions 108 are keyed off the URL, as will be further explained hereafter.

Notes API 136, Notes designer 138 and client 140, external applications 142, including Java agents 144 and LotusScript 146, are located off of open storage 130. Open storage 130 is storage where a document can be communicated, such that external applications 142 may manipulate it. QuickPlaces, pages, folders, can be created and changed, and data 148 can be imported and exported, using agents in Java 144 or LotusScript 146.

QuickPlace is primarily concerned with representing the collaboration space. Consequently, designers and consultants are able to integrate into that space custom features and data from other applications. HTML forms 122, written using an HTML editor 124, skins 248 (HTML 244 and QP tags), external files written using Java 118, and MS office documents 250 from MS office 228, may be imported to server 100 by dragging and dropping 111 from local storage 502 into an upload control panel 240 in browser 112.

An alternate client 126 and encapsulated place types 128 may be provided from which other collaboration spaces 129 can be created that take advantage of the QuickPlace storage model, providing functionality which can be manipulated using browser 112, including the integration of external technology providing opportunity for deep customization.

Server/Client Components

Figure 2:
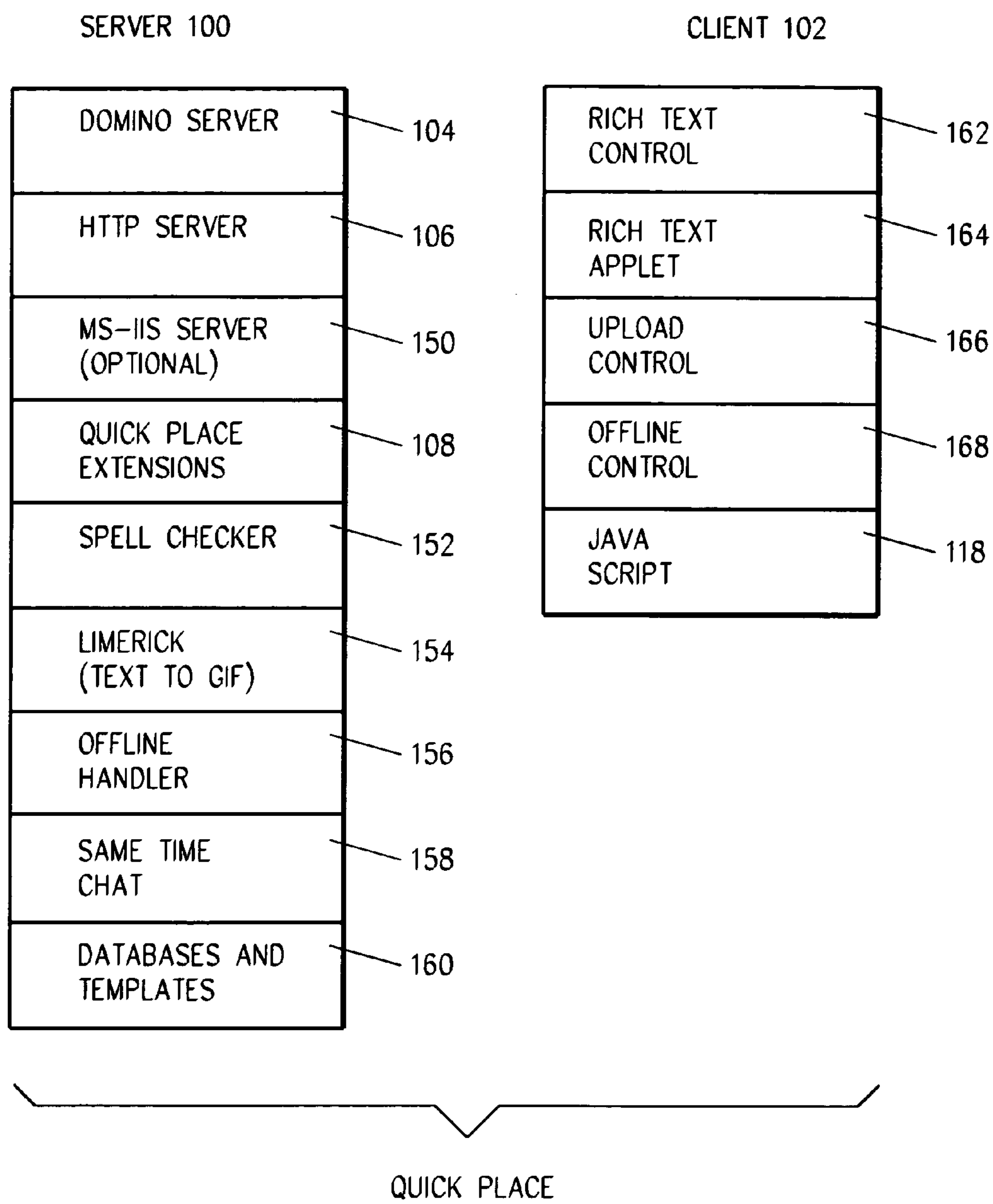
FIG. 2 is a schematic representation of various server and client components implementing the collaboration space of the preferred embodiments of the invention.

Referring to FIG. 2, in accordance with an exemplary embodiment of the invention, several components comprise QuickPlace server 100 and client 102.

QuickPlace is built on top of the Domino server 104. In the case of a stand alone installation, a subset of the Domino server is installed. Server 100 also includes HTTP server 106, or the optional MS IIS server 150. QuickPlace extension 108 is where we built most of the collaboration space implementing code exists the server 100. Server 100 also includes a spell checker 152 and a text to GIF converter (Limerick).

Client 102 includes rich text edit control 162, and applet 164 with which to apply various attributes and is a key component of the QuickPlace experience. Upload control 166 is used to attach and upload files, such as bringing in an agent and uploading it to a place. This is also used to bring in an imported HTML form or a different skin. Upload control is implemented to allow ease of use via drag and drop. Java script 118 includes code downloaded to the client to complete the generation of HTML pages.

Collaboration Space Object Model Overview

Figure 3:
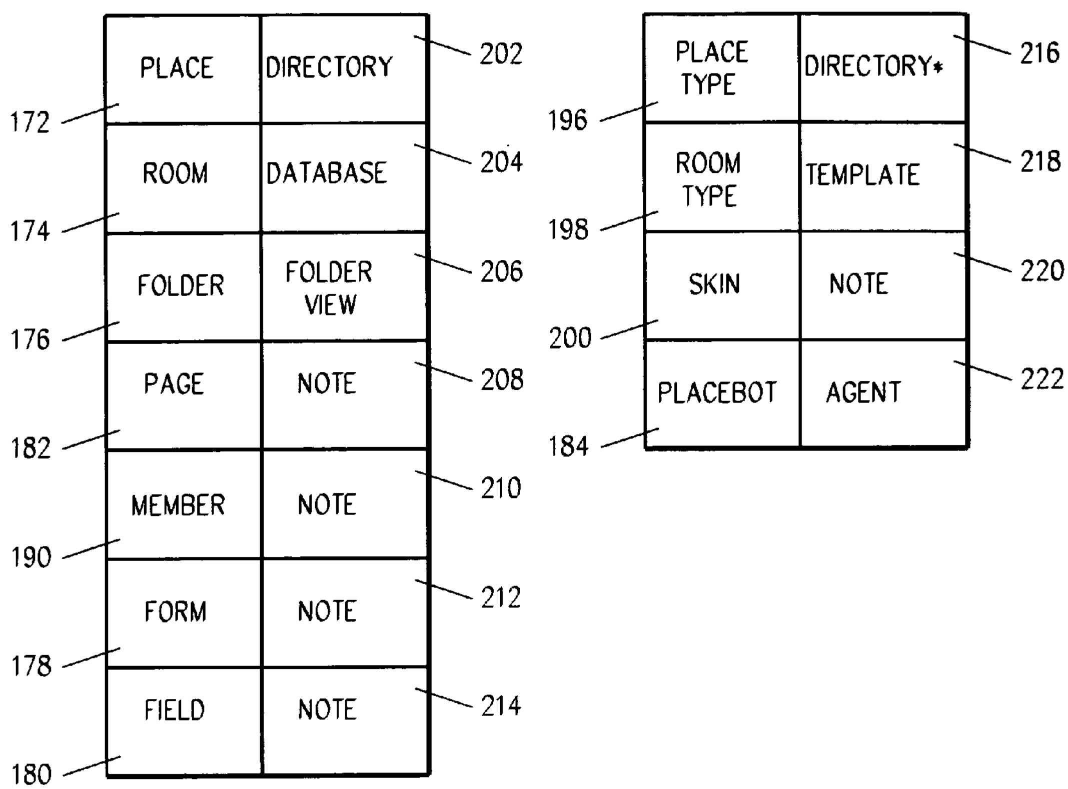
FIG. 3 is a schematic map illustrating Domino objects relating to the object model of the collaboration space of the preferred embodiments of the invention.

Referring to FIG. 3, the collaboration space of the preferred embodiment of the invention, referred to as QuickPlace, is implemented with an object model which comprises very few objects, very few concepts in order to make it easy to build and manage. And the fewer concepts, the better.

Referring to FIG. 3, the object model is independent of its implementation. There exists a place 172 that has rooms 174, and there are pages 182 in those rooms. And then there are members 190 of the place. Those four objects 172, 174, 182 and 190 are the primary objects.

Folders 176 add more complexity to the model, but bring a lot of benefit as well. Pages 182 are organized within folders. Two further objects are primarily visible to the designer of the place. And these are forms 178 and fields 180.

Place type 196 is a more advanced object, and is an object from which a place 172 is created. Place type 196 represents the foundation for building true collaborative applications. Everything created in building collaboration space is done in a place 172. Once such a place is created, it can be made a template 266 (FIG. 6) and copied as a place type 196. Once it becomes a place type 196, it is available for use by others for building additional places 172 that include the format, look and feel, and other characteristics of the original place.

Figure 10:
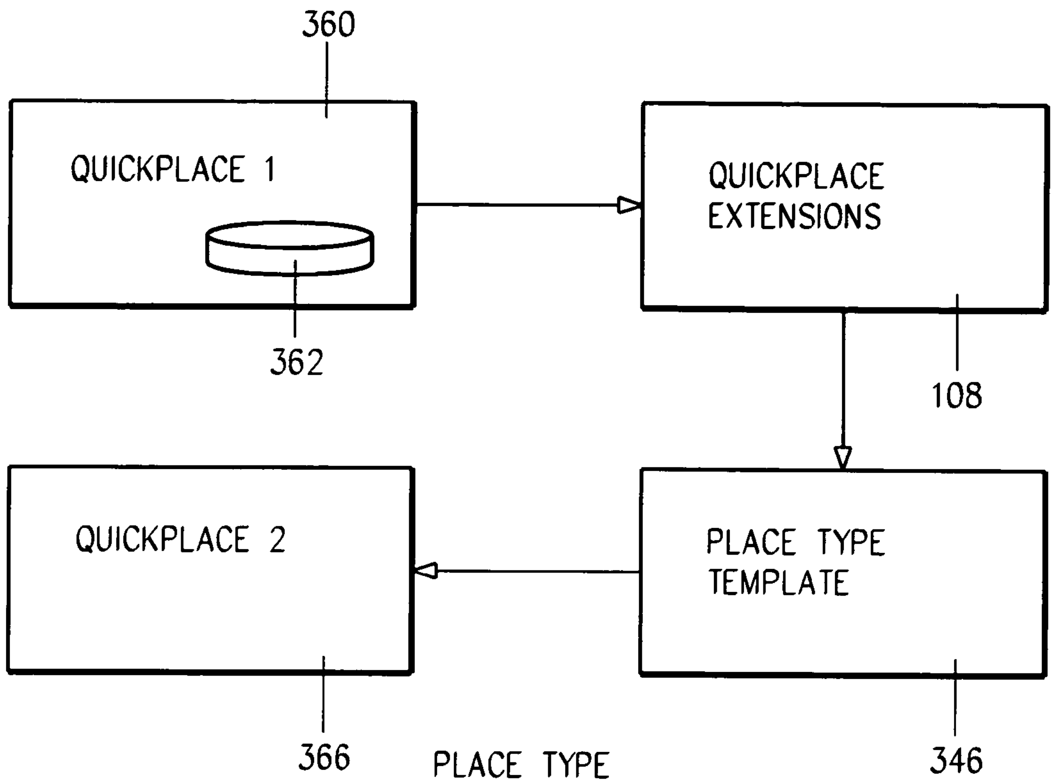
FIG. 10 illustrates the conversion of a place into a place type, or template, from which additional places may be created.

This is illustrated in FIG. 10, where a first place 360 is converted by QP extensions 108 into a place type, or template 364 from which additional places 366 may be created.

Room type 198 is an object provided for creating rooms 174 which are of a given type.

The last two objects illustrated in FIG. 3 are skins 200 and PlaceBots 184. Skins 200 control everything about the user interface, including layout and style. Layout defines the positioning of components on the screen. Style defines the form and colors of those components. A PlaceBot 184 is an enhanced agent, enhanced in the sense that it enables the use of Java or Lotus Notes or equivalent text editors. Once written using such an editor, and uploaded to a place 172, the server compiles the PlaceBot into an agent, reporting any errors. The agent resulting from a compiled PlaceBot can be scheduled to run at certain times, or upon opening a form. That is, the PlaceBot may be associated with a form, such as a sales order which, when opened, will cause the agent to execute. Thus, PlaceBots 184 are an essential part of building collaboration applications, for they are the primary repository for custom logic.

Referring further to FIG. 3, a preferred implementation of the object model heretofore described uses Lotus Notes/Domino concepts and objects. Thus, Notes/Domino file system directory 202 represents place 172; database 204 represents room 174; folder view 206 represents folder 176; pages 182, members 190, forms 178, fields 180 and skins 200 are represented by notes 208, 210, 212, 214, 220, respectively.

Place 172 is represented as a file system directory. So whenever a place called Acme is created, a file system directory 202 called Acme will be instantiated. Within that directory 202, there are a number of objects. Each room 174 is a Notes database 204. Folders 176 are implemented as Notes folders or views 206 depending on what's more convenient for the particular folder.

Pages 182 are a combination of data notes, forms and sub-forms 208. A member 190 is a data note 190 in a context room 174. Forms 178 and fields 180 are data notes. Place type 196 is a directory* 216 that contains all the rooms 174 that make up that place type. A room type 198 is a template 218. Skins 200 are a note 220 and PlaceBot 184 is an agent 222.

Notes/Domino Implementation of the Object Model

Developers familiar with the Domino Object Model (Domino OM) will be able to leverage their existing skills when developing on the QuickPlace platform. "PlaceBots" for example are actually implement Domino Agents, and it is possible to create and test them on Domino Databases. Within the QuickPlace object model (OM), however, there are some divergences from the Domino OM. For example, QuickPlace forms 178 are not the same as Domino Forms. QuickPlace forms more closely resemble Domino Documents, because they are created using a Domino form, and contain a Domino text field with a value of "h_Form". The value of "h_form" tells QuickPlace that this Domino document should be rendered in a browser as a QuickPlace form 178.

This structure provides flexibility for Web applications with less complexity than if Domino Forms were used. For example, in a default QuickPlace, EL user can create a new QuickPlace form 178. The user chooses which fields to include in form 178, in what order they should appear and what text and or graphics should appear near them. To create this sort of instant structure on the Web using Domino Forms would be very complex indeed. QuickPlace has extended this concept of being able to use HTML to define forms 178 by enabling the creation of custom QuickPlace forms using imported HTML 122. These Forms not only make use of Web authoring technologies such as Java Script, but also have the back end support of Domino. This back end logic is implemented via tools such as PlaceBots (Domino Agents) 184. This means that forms 178 have the ability to not only to define the look and feel of visible parts of an application, they also have the potential to initiate workflow and many other powerful automated features.

QuickPlace forms 178 have been optimized by stripping away many of the Notes features not required when used on the Web. A another advantage of this structure is that it enables the use of Web authoring tools to extend the objects. For example, with respect to QuickPlace forms, it is possible to modify forms using XML, Java Script and HTML and any other Web tools. Knowledge of Java Script and HTML are more common than Domino Designer skills, thus making the QuickPlace a very open platform. Some parts of the QuickPlace OM implement Domino/Notes functionality in different ways to a standard Domino application. For example, QuickPlace uses Domino's security and authentication model as a basis for its management of access to QuickPlaces. However, instead of primarily utilizing the Domino Directory, QuickPlace also uses a Contacts1.nsf database for each QuickPlace.

Containment and Association of Objects

Figure 4:
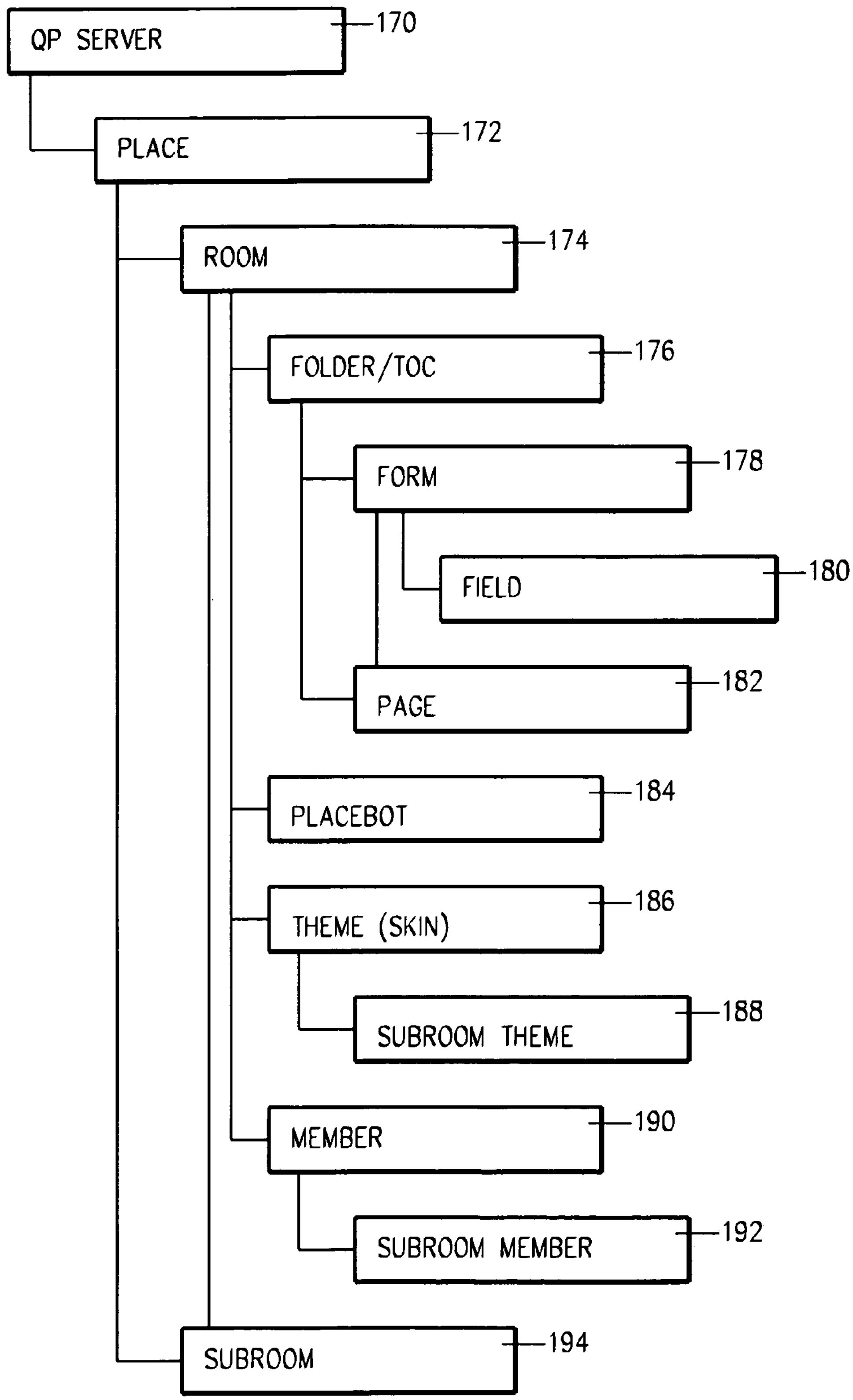
FIG. 4 is a schematic map of the object model implementing the collaboration space of the preferred embodiments of the invention.

Referring to FIG. 4, this object model is further described. FIG. 4 illustrates selected QuickPlace objects, the directory structure and how Objects relate to each other within the hierarchy. This model provides a visual representation of the containment and association between objects.

QuickPlace Server

The highest level of the model is the QuickPlace Server 170. Within server 170 are all of the QuickPlaces 172 as well as the resources they access to finally render Web applications.

This FIG. 4 displays the Model focusing on QuickPlaces. The following explanation, written from a programmers perspective, describes each of the objects of the model and they can be accessed in an application.

QuickPlace uses notes for many of its objects 182, 190, 178, 180 and 200, so that objects in the Place can be organized more easily. Table 1 sets forth the QP objects and their Notes/Domino equivalents. As an example of how design Notes are implemented consider the Table Of Contents (TOC). The Table Of Contents is a list of pages, folders and tools such as the Customize Area. Domino Folders may be listed using a link document, or Note.

TABLE 1

QUICKPLACE OBJECTS AND DOMINO EQUIVALENT

| OuickPlace Object | Domino Equivalent |
|---|---|
| QuickPlace Server | File Directory |
| Place | File Directory |
| Page | Data Note, Form & Subform |
| PlaceBot | Domino Agent |
| Theme | Data Note |
| Member | Data Note in Contacts1.nsf |

TABLE 1-continued

QUICKPLACE OBJECTS AND DOMINO EQUIVALENT

| OuickPlace Object | Domino Equivalent |
|---|---|
| Subroom * | NSF Database |
| SubroomTheme | Data Note |
| SubroomMember | Data Note in Contacts1.nsf |
| Room | NSF Database |
| Folder / TOC | Folder or View |
| Form | Data Note |
| Field | Data Note |

* Subrooms contain their own set of Folder, Page, Form, Field, PlaceBot & Subroom Objects QuickPlace Server 170 is a file directory containing all Places and Resources. The Domino equivalent is a file directory 202 named "quickplace". This identifies the main folder 176 for a QuickPlace server 170. If the QPServer 170 is running as a stand alone, this folder will be in the QuickPlace data folder. For example D:\QuickPlace\Data\quickplace.

If the QPServer 170 is running on top of a Domino server the folder will be the Domino Data folder. For example D:\Lotus\Domino\Data\quickplace.

To locate QuickPlace Server 170 in PlaceBots and get access to all of its databases, a LotusScript method GetDbServer is executed together with a test that the Path to databases starts with "QuickPlace".

Place Object

Place object 172 is a directory in the "QuickPlace" directory grouping resources for a Place. The Domino equivalent is a file directory bearing the name of the QuickPlace. Place object 172 is a directory that brings together a Place for organizational purposes. It also identifies the NSFs 114 as belonging to the place 172 by bearing the name of the QuickPlace. As distinguished from a place object 172, the main room 174 in a QuickPlace is a database called Main.nsf. Place object 172 groups and identifies the Main.nsf resources for the Place and any subrooms 194 in the Place. Place object 172 contains several files. There is a Main.nsf, Contacts1.nsf and a Search.nsf file. If the QuickPlace has a Subroom 194 there will also be an NSF file with its name starting with "PageLibrary". Each of these page library files is a Room 174.

The place object in PlaceBots 184: place object (directory) 172, contains the databases which form a place. When writing PlaceBots, one can search for this directory by using the name of the QuickPlace. In this directory will be found all the databases will belong to that place 172. This file directory's name is the name of the QuickPlace. For example, if the QuickPlace is called "Millennia", this directory has the following path within the QuickPlace server 170:

\millennia

To find the place object 172 for the Millennia Place in LotusScript the script procedure of Table 2 may be used:

TABLE 2

SCRIPT PROCEDURE FOR FINDING A PLACE

```
Dim ndbPlace As NotesDatabase
Set dirPlace = New NotesDbDirectory( g_sServerName )
```

TABLE 2-continued

| SCRIPT PROCEDURE FOR FINDING A PLACE |
|---|
| Set ndbPlace = dirPlace.GetFirstDatabase( DATABASE )<br>sNdbPlaceFilepath = ndbPlace.FilePath<br>If Instr(1, Lcase( sNdbPlaceFilepath ),<br>\|quickplace\millennia\| ) Then<br>`//the Place is found |

Room Object

Room object 174 is the main container for a Place, containing a collection of pages and tools. The Domino Equivalent an NSF Database. The room 174 is the main container for a QuickPlace's content. For example, when using the Millennia Place, most of what is seen is contained in the Room object. The Room object is always called Main.nsf, and holds folders 176 and pages 182 for the QuickPlace, as well as managing links to any subrooms 194 in the place object 172. Room object 174 uses elements held in other databases. For example many of the standard images QuickPlace displays are in a resources object (not shown). Each room 174 has its own security and authentication, and the information required to do this is contained in databases such as Contacts1.nsf. A room 174 breaks down a place 172 into smaller areas to help define structure. Each room 174 has its own security and authentication. This allows separate user groups. It also means that subrooms 194 can be created for separate projects, forming a separate shared space. The room object 174 then forms a common entry point where shared resources can be stored.

The room object in PlaceBots: to locate a room 174, one looks in the main QuickPlace Server 170 directory, then looks into the room object (a directory bearing the name of the QuickPlace), then looks for a database called "Main.nsf".

Returning to previous LotusScript example of locating a Place 172 (Table 2), the match string can be extended from "quickplace\millennia" to "quickplace\millennia\main.nsf" to find the room object 174, as set forth in Table 3.

TABLE 3

| SCRIPT PROCEDURE TO FIND A ROOM OBJECT |
|---|
| Set dirPlace = New NotesDbDirectory( g_sServerName )<br>Set ndbPlace = dirPlace.GetFirstDatabase( DATABASE )<br>sNdbPlaceFilepath = ndbPlace.FilePath<br>If Instr(1, Lcase( sNdbPlaceFilepath ),<br>\|quickplace\millennia\main.nsf\| ) Then<br>`//the Room id found. |

To access elements contained in a room 174, the views and folders 176 in the room are accessed. For example to find the elements visible in the Table Of Contents (TOC), the "h_TOC" view is used.

The Room object 174 in HTML is visible in URLs as the "main.nsf". To access room object 174 most easily, a relative path is used from the current object if it is in the same Place 172. For example, when creating a URL link from a subroom 194 to a room 174, the URL begins as follows:

<a href="../../Main.nsf/ where the "dot dot slash dot dot slash" syntax is a part of the URL, not an abbreviation for this example. Using this relative URL makes the URL more robust. In other words, this URL can be used to find the (Main.nsf) room 174 for any place 172.

Room fields 180 used to define rooms 174 are set forth in Table 4.

TABLE 4

FIELDS DEFINING ROOMS

| Field Name | Description |
|---|---|
| h_HaikuName | The name of this Place |
| h_AreaType | The name of the template used to create this room. |
| h_AreaParent | The name of the parent database |
| h_ShowSecurity | If h_SetSecurity = 1, the QuickPlace server sets h_ShowSecurity to 1. |
| h_SetCalendar | Determines if the Calendar will be visible in a Room. If the field has the value of "1" a link to the Calendar will be displayed in the sidebar |
| h_SetSecurity | This field works in conjunction with the h_ShowSecurity field. It is only valid for Readers and Authors, because Managers must always be able to edit security of a Room. If the field is set to "1" a link to the Security page will be displayed in the sidebar for Readers and Authors (if they select Security in this case they will see only their own information) |
| h_MailDb | The name of the database that receives email addressed to this Place. |

Folder Object

A folder object 176 is an object for indexing content, grouping related pages 182, and dividing a room 174 into sections without imposing new security. The Domino equivalent is Notes folder or view 206, and Notes folders 206 have three functions. For the user, they provide a logical grouping of related documents. This makes it easier for the user to find documents, and allows people with a shared interest to work an area of a QuickPlace. The other way of using folders is in the user interface, or "User" folders. Within user folders there are seven different types:

1. Standard List
2. Headline
3. Slide Show
4. Response List
5. Ordered List
6. Table Of Contents
7. Index Folder types 1 to 5 are all available as styles for new, custom folders. From the a site manager's perspective, a Folder allows a QuickPlace to be divided into areas for separate groups of people, without having to be concerned about access control which would be necessary if a Subroom 194 were used.

Fields include the following:

"h_LastAttachmentDirectory": used when getting attachments. This field enables users to quickly upload attachments. For example, each time a Layout file is uploaded, QuickPlace knows where to go looking for the file. This path information is sourced from this field.

"h_DirtyAesthetics Number": indicates which items should be checked (once a part of the aesthetics has been tweaked, a check mark indicates that the part has been changed).

h_AreaHasAesthetics: indicates if a Room has its own aesthetic settings enabled. If the field value is "1" the Room has had the aesthetics tweaked.

The third way that folders 176 are used is to allow developers to locate elements in a QuickPlace. To a developer, folders are indexes that allow look ups, therefore giving programmatic access to elements.

When any page renders in a Browser, the time it takes to render is directly dependant on the amount of information to be downloaded. The amount of information required to render a Folder is less than for a Page. When Pages appear in Edit mode, there is yet more information required to render it. Therefore, the quickest load time for a QuickPlace by first using a folder 176 as the first page the user sees when upon selecting a place. Once users have visited a folder 176, a subset of the resources used to render a page 182 will already have been downloaded. The folders used by developers are slightly different to than the folders users would use. The h_Index lists the published pages in the Place and appears as the standard index of a Place, and the h_TOC is the table of contents list.

Some of the folders in look ups by developers are set forth in Table 5.

TABLE 5

VIEWS USED TO REFERENCE OBJECTS

| View Name | Description |
|---|---|
| h_Index | Provides a list of all published Pages in a Room, listed by h_UNID, the unique identifier for a Page. Lists all published items in a Room, this not only includes Pages but all of the Objects in a Place. For example, Pages, PlaceBots, Fields, Skins and Forms. |
| h_QDK | Every Design Note in a Place. The h_QDK view contains a form formula to open different documents using different forms. For example: If the field "h_Type" is "0" then use the form named "h_Page". The result of this form formula is that the QDK view allows developers to inspect the properties of some Design Notes. The supported types are: "h_Page", "h_Folder", "h_Room", "h_SubRoom", "h_Error" and "h_RoomType". |
| h_TOC | List of all items displayed in the Table Of Contents. Items must have the "h_IsInTOC" field with a value of "1" and be published with no replication-save conflict. |
| (All) | Every item in the Room. Sorted by the h_Name field: the readable name of the item. For example "Welcome", representing the default Welcome page. |

The Place Object in PlaceBots: Internally, default QuickPlace Folders have readable titles. For example the response folder discussion" has the internal name of "h_Discussion" in the "h_SysName" field. A new response list style folder is called "SchwatzRaum" ("chat room" in German). The internal name of the SchwatzRaum Folder is: "h_F49791727035ACD1C12569510063087C" (which means ("h_F49791727035ACD1C12569510063087C" in German). This unique identifier can be used in PlaceBots to locate the Folder. A lookup can be done in the "h_Folders" view of a QuickPlace to find the readable name of the folder. Another solution is to retrieve the name of the field by accessing the value in the h_SysName field. The Table of contents and the Index are special user Folders 176. Only one TOC and one h_Index exists per Room 174 or Subroom 194. They exist from the moment the Place or Room is instantiate, and change them.

Folder Fields

The following Fields are used to define data notes that render as Folders. Folders exist in a visible form within a QuickPlace. In other words they can be viewed by opening the NSF file in the Notes Client or Domino Designer. In conjunction with this view, a data note exists, providing information about that Domino View or Folder. Table 6 lists the fields are contained in the data note and provide information about the Domino View or Folder.

TABLE 6

FIELDS USED TO DEFINE FOLDERS

| Field Name | Description |
|---|---|
| h_FolderStyle | When creating a new folder, one is given the choice to create a new folder based on a number of templates. This field denotes which type of folder has been created.<br>"1" = Standard List<br>"3" = Headline<br>"4" = Slide Show<br>"5" = Response List<br>"7" = Ordered List |
| h_FolderStorage | The "internal" name of the folder, in other words, the name by which it is known to the system. The value of this field is used in documents to tell QuickPlace in which folder it should be used. |
| h_CanAddPages | When creating a new folder, the manger is presented with the options, to the question "Who can add pages to this folder?". If only managers is chosen the value of "0" is written to this field. The default is "" which means all authors can add pages to this folder. |

Form Object

A form object 178 is a document used to create new QuickPlace content. The Domino equivalent is a data note of type "h_Form". Form object 178 is a resource used to create, manage and display content, therefore defining the schema of the application. Forms contain fields to hold data, therefore creating and displaying content. Forms can also contain scripts within them to provide logic within the Page. For example, a form can contain form validation to make sure that a field contains only numbers. Forms can also initiate processes outside the page. This is done by creating a PlaceBot 184 and associating the PlaceBot with a Form 178. PlaceBots 184 are not contained by the Form but there is a association between them.

Forms are created with the Domino Form "h_PageUI" with the field h_Type set to "h_Form". New forms 178 with custom structure and logic can be created by room managers.

Form Fields

Table 7 sets forth the fields 180 used to define the structure of a form 178.

TABLE 7

FIELDS USED TO DEFINE FORMS

| Field Name | Description |
|---|---|
| h_FormDescription | The content of this field appears as the description of the form appearing in the “New” page. |
| h_WorkflowType | Allows 1–4 approvers and some other |
| h_ApprovalCycle | options. This is normally set to “h_Standard”. |
| h_EditorInChief | Allows 1 approver and fewer options. |
| h_MultipleEditors | By setting this field, all members of QP to edit pages created with this form. |
| h_Standard | None of the above. |
| h_SetPageComponent | sView Should = h_FieldDefinitions |

Field Object

Field object 180 is used to construct (HTML formatted) input fields in forms 178. The Domino equivalent is a Data note of type “h_Field”. Fields are constructed from the Domino Form “h_PageUI” with a the field h_Type set to “h_Field”.

QuickPlace field object 180 defines the structure of the container, not the content. The values contained in a page 182 are contained by the page, not the fields 180. The h_FieldType attribute to a field 180 determines what sort of field it is. This determines what the field will do when it is rendered in a browser. For example, a field 180 of type h_DateControl will provide the user with a date picker widget.

Domino fields are used to define the attributes of QuickPlace fields 180 are set forth in Table 8. QuickPlace fields 180 are drawn to the screen as HTML, they are not created by a Domino Field in a Domino Form.

TABLE 8

FIELDS USED TO DEFINE FIELDS

| Field Name | Description |
|---|---|
| h_IsUser | Defined h_True means this is a custom form |
| h_PublishInFolder | UNID of the folder +“\|” + |
| h_FolderStorage | name of the folder |
| h_Name | “Import” and is related to the h_SystemName field which often has a similar value such as “h_Import”. |
| h_FieldLabel | Instructional information that might be useful for someone editing this field. Similar to the Static h_FieldType. Containing information to help the user, but only displayed in edit mode.“ For example: <script> (h_CurrentSkinType = = ‘h_Edit’ )?”“: C(self, ‘Note: Clicking on the title of this page in its folder or in the sidebar will open the page that it points to. To edit the page again later, click its title in the Index.’);</script>” |
| h_ContainerUNID | The UNID of the Form which contains this field. QuickPlace uses a Design Note to create forms, each of these having an internal name. The h_ContainerUNID contains the internal name of one of these QuickPlace Forms. |

TABLE 8-continued

FIELDS USED TO DEFINE FIELDS

| Field Name | Description |
|---|---|
| h_FieldType | There are many different types of Fields. The following types are listed as examples to help understand how Fields work in general. |
| “h_Attachments”= | Enables the attaching of files. |
| “h_CalendarControl”= | Includes date and time controls and a duration field |
| “h_DateControl”= | Date field with date picker widget |
| “h_DateTime”= | Contains Date and Time information. |
| “h_DocAuthor”= | Contains a Domino Heirachical name of the original Author of the Document. |
| “h_DocCreated”= | Creation date of the page. |
| “h_DocModified”= | Modified date of the page. |
| “h_DocSize”= | Size of the page. |
| “h_NamePopup”= | Select listing members of the QuickPlace |
| “h_RichText”= | Rich text field. Allowing editing via the rich text editor applet. |
| “h_Serial”= | A unique number to identify the document. |
| “h_Static”= | Static text, used to provide information about the accompanying field. May also include link to an image. |
| “h_Subject”= | The Documents subject. |
| “h_TaskControl”= | Used in the Task form to insert the task control tool. |
| “h_TextInput”= | Simple text equating to the “<input>” field in HTML. |
| “h_TextPopup”= | Text select list, equating to the “<select><option>” in HTML. |
| “h_TimeControl”= | Select lists for hours, minutes, AM/PM. |
| “h_CalendarControl”= | Field containing control tool used in the calendar field. |
| “h_CreateMSExcel”= | Field enabling the upload of Excel documents. |
| “h_CreateMSPowerPoint”= | Field enabling the upload of PowerPoint documents. |
| “h_CreateMSWord”= | Field enabling the upload of Word documents. |
| “h_Import”= | Field enabling the upload of imported documents such as HTML. |
| “h_MultipleImport”= | Field enabling the upload of multiple documents, such as a series of HTML documents. |
| “h_NotifyIndicator”= | Field indicating if members should be notified of the creation of content or their inclusion in the Contacts1.nsf. |

Page Object

Page object 182 is a basic building block for content. The Domino equivalent is a data note, form and subform. Pages form the basic units of content, relying on the structure of QuickPlace to create, manage and render them in a Web browser. It differentiates structure and content cleanly. Notes structural elements such as Forms Views and so on provide structure, whereas Notes Documents provide pure data content. In the Domino environment the division between structure and content becomes blurred. This is because when the data in a document is being represented in a Web browser, it is possible to use the data to format itself using HTML. The data is able to start defining structure by creating HTML links, tables, references to images and so on. In the QuickPlace OM, the same is true. Pages can be created in a number of ways. Table 9 sets forth the fields used for defining page objects.

TABLE 9

| FIELDS DEFINING PAGE OBJECTS | |
|---|---|
| h_NotInSearch | Having the value of "1" will exclude the field from being included in a full text search. This allows functional content in fields such as Java Script or static text to evade returning a hit during searching. |
| h_Position | Indicates the fields position of appearance in a form. Typically numbers such as 100 are used. |
| h_FieldFormat | "h_FieldFormat" indicates formatting options, "h_All" "h_BannerOptional" "h_BannerRequired" |
| h_BannerRequired | Always display subject as a banner at top of page |
| h_BannerOptional | Allow user to choose banner or not |
| h_NoBanner | Do not display the subject on the page |
| h_FieldIsRequired | 1 = The field is required and the user will be prompted if they do not fill it out. |

Page Fields

Page Object in LotusScript and Java Script: developers wanting to customize pages 182 will generally want to manipulate the page's field 180 values. Fields existing in a Page are generally rendered to the HTML document in the background as Java Script variables. They are then visibly rendered via document.write( ) functions. If a field exists, it can be accessed in the browser via a variable with the same name as the field.

The PageBody Field holds the main content or "body" of the page.

Table 10 sets forth the fields 180 used to define page 182 documents in QuickPlaces.

TABLE 10

FIELDS USED TO DEFINE QUICKPLACE PAGES

| Field Name | Description |
|---|---|
| h_Form | The QuickPlace form used to create this page. This is not the Domino "Form" field which denotes which form Domino links the file to. The Domino "Form" field will contain "h_PageUI" for virtually all objects in a QuickPlace. |
| h_PageType | This field is set to null when the document is a visible document. Only when the object is in design mode do the other values appear: "h_Response" the document is a response to a topic document. This value is only valid in response folders. "h_Revision" this means that the document is being revised, and is not available for public access. "h_Mail" means that the document is a mail document, being either sent or received by QuickPlace. |
| h_Originator | The creator of this page. This field contains a full hierarchical name, for example: "CN=David Wyss/OU= QuickPlaceName/OU= QP/O= ServerName". All users have the second OU part of the name set to QP. This is done so that when QuickPlace is used on an Overlay server (QuickPlace and Domino together) QuickPlace can avoid conflicts between Domino registered users and QuickPlace users. |

TABLE 10-continued

FIELDS USED TO DEFINE QUICKPLACE PAGES

| Field Name | Description |
|---|---|
| h_NameIsBanner | Denotes if the page's name should be displayed as a banner. If it is to be displayed as a banner, this field contains the value "1". Setting this field is done when the user clicks on the "Show the title, author and date on page?" checkbox. |

The Java Script "document.write" method is used when using the PageBody to write out HTML content in a QuickPlace page. This field can be printed onto the screen via a document.write (PageBody) method called in a QuickPlace document. The following is an example of using this technique.

In a Placebot, write the contents of the document into the PageBody field. If the PlaceBot has not run, or not run correctly, the PageBody field will be empty. If the document is displayed in a form where the PageBody Java Script variable is not declared, an error will be reported. To avoid an error through an undefined variable, use the "typeof" operator. This test assigns a message string to the sPageBodyMessage variable and prints that instead of the PageBody. To customize this message, the text in quoted on the PageBodyMessage line is changed. Then the following is included in the HTML document:

```
<script language=JavaScript>
if ( typeof( PageBody ) = = "undefined" ) {
var sPageBodyMessage =        'Run the Mapperizer PlaceBot
                              to see a site map here...';
document.write( sPageBodyMessage )
} else{
document.write( PageBody )
}
</script>
```

Page Object in HTML: some of the most commonly referenced Java Script variables in Pages are set forth in Table 11.

TABLE 11

COMMONLY USED Java Script VARIABLES IN PAGES

| Field Name | Data Type, Description |
|---|---|
| h_Name | String, readable name of the Page |
| PageBody | String, content of the page. |
| h_SystemName | String, the internal name of a page. For example, 'h_Welcome' |
| h_Originator | String, full Notes format name of the document creator For example: 'CN=Anna Rath/OU=Millennia/OU=QP/O=Server'; |
| h_IsPublished | String, number representing "1" for published or "0" for not published. |
| h_LastTimePutAway | String, representing the date and time the Page was last saved '09/03/2000 07:54:08 PM' |
| Form | String, Domino Form name used to create the Page. Most documents in a QuickPlace are created with the 'h_PageUI' Form. The value that differentiates fields is the h_Type field. |

TABLE 11-continued

| COMMONLY USED Java Script VARIABLES IN PAGES | |
|---|---|
| Field Name | Data Type, Description |
| HTTP_COOKIE | String, all cookies available to that Page. |
| HTTP_HOST | String, name of the server. For example 'millennia.com' |
| HTTP_REFERER | Page used to send the user to this page. |
| HTTP_USER_AGENT | String, browser used to access the current Page. For example: 'Mozilla/4.0 (compatible; MSIE 5.0; Windows NT; DigExt)' |
| REMOTE_USER | String, full name of the person reading the Page, for example: 'CN=Doug Mudge/OU=Millennia/OU=QP/O=Server'; |
| Server_Name | String, the server name, for example: 'dwyss.lotus.com' |
| h_DocSize | Integer, size of the page, for example: 4705 |
| h_ModifiedDate | String, date and time the page was last saved, for example: '09/03/2000 07:54:05 PM'; |

Using Notes name format in pages can be done with the following Java Script Function:

```
function fnGetSimpleName(sTxt) {
iTxtStart = sTxt.indexOf('=');
iTxtStart++;
iTxtEnd = sTxt.indexOf('/');
if (iTxtEnd = = −1) iTxtEnd = sTxt.length;
sTxt = sTxt.substr (iTxtStart, iTxtEnd − iTxtStart);
return sTxt;
};
return fnGetSimpleName ('CN=Doug Mudge/OU= Millennia/OU=
QP/O=Server')
```

This Java Script will return the string "Doug Mudge"

PlaceBot Object

A PlaceBot object 184 is a Java or LotusScript Domino Agent, used to create or manipulate QuickPlace objects automatically. Domino Equivalent: Domino Agent.

For Java and LotusScript programmers, the PlaceBot is the main way of implementing sophisticated functionality to a QuickPlace. Within the bounds of an HTML document, industry standard authoring tools such as HTML are used. To make links between Objects and manipulate QuickPlace Objects, PlaceBots are used. The PlacelBot object is further described in copending U.S. patent application Ser. No. 09/752,115.

Theme Object

A theme object 186 is a group of files which defines the look and feel of a QuickPlace. The Domino equivalent is a group of data notes.

Themes are a mechanism for determining the layout and appearance of a QuickPlace. They also help introduce functionality, and although not their primary function, some content. There are two types of themes 186 in QuickPlace. User defined or custom themes and default themes.

Subroom Theme Object

The subroom theme object 188 is a subset of themes 186 in a QuickPlace. The Domino equivalent is a data note. By default, subrooms 194 inherit the theme 186 being used by the (main) room 174. Only when the theme being used in the subroom 194 has been modified, does it act independently of the room 174.

Member Object

A member object 190 is a data note listing a user in the Contacts1.nsf. The Domino equivalent is a note in contacts1.nsf. Members 190 are records specifying user-access to a room 174. A member note contains information about a team member of a QuickPlace. In addition to this data, the member must be listed in the access control list (ACL) of main.nsf and in a group in names.nsf to pass authentication.

Table 12 sets forth the fields 180 used to define members 190.

TABLE 12

| FIELDS USED TO DEFINE MEMBERS | |
|---|---|
| Field Name | Description |
| h_Password | This member's password. Encrypted with @Password |
| h_FirstName | This member's first name |
| h_LastName | This member's last name |
| h_PhoneNumber | This member's phone number |
| h_EmailAddress | This member's email address |

Table 13 sets forth the fields 180 used to define Groups.

TABLE 13

| FIELDS USED TO DEFINE GROUPS | |
|---|---|
| Field Name | Description |
| h_Members | The list of members who belong to this group, listed in full heirachical format. |

Subroom Member Object

A subroom member object 192 is a subset of entries in the main room 174 of a QuickPlace. The Domino equivalent is a Data note in contacts1.nsf. Subroom member 192 has a similar structure to a room member 174, but specifies user-access to the SubRoom. These SubRoom members 192 are a subset of the (main) room 174 members list. This means that to grant access to new users, they must first be added as readers (or greater) in the main room 174.

SubRoom Object

A subroom object 194 is a container within a QuickPlace with separate security to main Room. The Domino equivalent is an NSF Database. Subrooms 194 are similar in structure to Rooms and are used to create discreet meeting places for subset of the Members in a Place.

The subroom object in PlaceBots: To locate a room, look in the main QuickPlace Server directory, then look into the Place Object (a directory bearing the name of the QuickPlace). The Subroom will be named "PageLibrary" followed by a 16 digit hexadecimal time stamp number, such as "0123456789ABCDEF" then the ".nsf" suffix. By way of example, the following script looks for a Subroom to the Millennia place:

```
Set dirPlace = New NotesDbDirectory( g_sServerName )
Set ndbPlace = dirPlace.GetFirstDatabase( DATABASE )
sNdbPlaceFilepath = ndbPlace.FilePath
If Instr(1, Lcase( sNdbPlaceFilepath ),
    |QuickPlace\millennia\pagelibrary| )
Then
```

The Instr method has been used to look for this database, down to the PageLibrary part of the string, because it is difficult to know what the 16 digit number will be.

Page Object in HTML: To create URLs to reference Subrooms, the URL is built in the Main Room using either the "h_Area" view or the "h_TOC" view to create the path. This View contains the "h-LocDbName" field as the first sorted column.

Resources Object

A resources object (not shown) is database of shared resources, having as its Domino equivalent NSF Database. It serves as a centralized container for resources required in all QuickPlaces on a server. Images, layout files and fonts are stored in this database. For example resources such as the button that appears beside the simple search image "Go.gif" is stored in this database. The easiest way to find items in this database is by scrolling through the h_System-NameView. A dummy form may be used to view such elements.

Common QuickPlace Object Fields

In Tables 14 through 18, fields and Java Script variables in the h_PageUI form are set forth. These include general fields which can be customized for each layout, fields to define publishing status, fields for defining locations, fields for defining security, fields for defining workflow status, fields for defining calendars, respectively.

TABLE 14

GENERAL FIELDS IN THE h_PageUI FORM

| Field Name | Description |
|---|---|
| h_Authors | Names of Authors who can edit the document. This is a particularly important field when creating PlaceBots which modify the access control to documents. |
| h_CurrentSkinName | Name of the Theme to be used in the page |
| h_CurrentSkinType | Name of the Skin to be used, such as Edit: "h_Edit", or for a custom Theme the ID: "c_E4257D50EE2DD800C12569440019C164" |
| h_FolderUNID | The system name of the folder the page belongs to. For example: "4695CA1530263B3AC1256946005E965C" -the internal code for a Folder, or "" when the page only appears in the TOC. |
| h_Form | The id of the QuickPlace-Form used to create the page, for example: "30DF3123AEFAF358052567080016723D". Note, that the form referred to here is actually a data note and not a Notes Form. |

TABLE 14-continued

GENERAL FIELDS IN THE h_PageUI FORM

| Field Name | Description |
|---|---|
| h_IsInToc | If the page should appear in the TOC, it is set to "1". If it does not appear there, it is set as "". |
| h_IsPublished | Set to "1" if the page should be visible to readers. |
| h_IsSystem | 1 = This is a system object. |
| h_Name | The user visible name of this object. |
| h_Position | Number used to sort the pages within the TOC. These typically have values such as 10000. This value should be handled as a Long when referenced in LotusScript. |
| h_SystemName | The name of this object as known to the system. |
| h_Type | Describes what sort of note defines. This field is used in all Quickplace Design Notes to tell what sort of document is being referred to. It is what differentiates between the Objects in QuickPlace.<br>"0" = Page<br>"1" = Folder<br>"2" = Room<br>"3" = Subroom<br>"4" = Error Page<br>"5" = RoomType<br>"h_Agent" = PlaceBot<br>"h_Member" = Member<br>"h_HaikuType" =<br>"h_Group" = Group<br>"h_Form" = Form<br>"h_Field" = Field<br>"h_Skin" = Layout file<br>"h_SkinGroup" = Skin Group.<br>h_Name Name of the page. |
| h_Originator | User name of the creator, such as "CN=User Name/OU= QuickPlaceName/OU=QP/O=ServerName" |
| h_TextAbstract | The abstract automatically created to summarize the page. This is useful in Java Script for displaying a summary of the text content in a document. |
| PageBody | The content or "body" of the page. If using the Java Script "document.write" method to write out HTML content in a QuickPlace element, such as an imported page, skin and so on, it is normal to do this via the PageBody field. This field can be printed onto the screen via a document.write (PageBody) method called in a QuickPlace document. To do this in a page, the document.write method is used to print the contents of this field to the page. |

System objects have special meaning depending on the type of object. The following tables describe fields in various QuickPlace Object types.

TABLE 15

FIELDS USED TO DEFINE PUBLISHING

| Field Name | Description |
|---|---|
| h_IsPublished | 1 = This object is currently published |

TABLE 15-continued

FIELDS USED TO DEFINE PUBLISHING

| Field Name | Description |
|---|---|
| h_IsHidden | 1 = This object is not shown to the user |
| h_SetReadScene | The name of the default scene (subform) to use when viewing this object |
| h_SetEditScene | The name of the default scene (subform) to use when editing this object |
| h_PublishedVersionUNID | If this object is being edited and the current object is the draft version, the UNID of the published version of this object. |
| h_DraftVersionUNID | If this object is being edited and the current object is the published version, the UNID of the draft version of this object. |
| h_LastTimePutAway | The last time that this object was changed: Published or Saved under construction. |

TABLE 16

FIELDS USED TO DEFINE FOLDERS LOCATION

| Field Name | Description |
|---|---|
| h_FolderUNID | The name or UNID of the Notes Folder where this page resides. |
| h_IsInToc | 1 = This object is shown in the Table of Contents (sidebar). |
| h_CurrentPosition | The position of this object with respect to other objects in the collection. |
| h_SetParentUNID | If this is a child or response object, the UNID of the parent object. |

TABLE 17

FIELDS USED TO DEFINE SECURITY

| Field Name | Description |
|---|---|
| h_Readers | If this object is protected from readership, the list of names, groups, and or roles that can read this object. |
| h_Authors | If this object is protected from authorship, the list of names, groups, and or roles that can author this object. |

Customizing the Object Model

While much of a QuickPlace can be customized via a browser, there are some parts of QuickPlace which can only be customized using a Notes Client and or the Domino Designer.

Changes that can be made via a browser, using Web authoring tools such as an HTML editor relate more to the user interface. For example, editing a skin can be done using an HTML editor. Changes made to QuickPlace Objects are done through the Notes client and in Domino Designer. For example, inspecting and customizing the images appearing in default QuickPlace pages must be done via the Notes Client.

QuickPlace Object Model and HTML: Building URLs

Building URLs in a QuickPlace is an important issue, due to the fact that QuickPlace is a browser based application. Understanding QuickPlace URLs is also a good way of understanding the object hierarchy in QuickPlace. The relationship between URLs and the QuickPlace Object model flows in both directions. Understanding the structure of URLs helps understanding the QuickPlace Object model. Conversely, once the QuickPlace object model is understood, how to use URLs to manipulate a QuickPlace becomes apparent.

URLs in QuickPlace use the same structure as in Domino. Domino URLs allow locating documents by using the key value of the first sorted column of a view, then generate a URL to link to a document using this key. Once the documents are located, they are not always opened in the browser. Sometimes they are read and their contents exposed and used by other objects.

An example of locating a file without opening it is when a QuickPlace skin accesses a Java Script LSS file. The user never sees the LSS page, but its contents are used by the visible page to render objects and perform functions. To locate a document in Domino, the initial part of the URL is pointed to the host server, then the database containing the required document. The next part of the URL must point to a view with the first column specified as being sorted. This first, sorted column becomes the key column. Then a URL is used to open the document, as in the following example:

http://Host/Database/View/Key?DominoURLCommand

Where:

View: is the name of the view. To access a document regardless of the view, substitute a zero (0) for the view name and specify the document by its universal ID.

Key: is the string, or key, that appears in the first sorted or categorized column of the view. If the key has spaces in it, substitute these for plus signs when creating a URL.

This syntax is used to open, edit, or delete documents and to open attached files. Domino returns the first document in the view whose column key exactly matches the Key. There may be more than one matching document; Domino always returns the first match. The key must match completely for Domino to return the document. However, the match is not case-sensitive or accent-sensitive.

DominoURLCommand: Is the instruction to Domino of what to do with the file when found. For example, ?OpenDocument, ?EditDocument and ?DeleteDocument.

If this DominoURLCommand is omitted a default will be substituted. For example, in the previous URL if the OpenDocument argument is omitted in a URL command the document will still open because the command is automatically interpreted as OpenDocument.

The structure of URLs in a QuickPlace is the same as in any Domino database. QuickPlace objects are quite often referred to via relative URLs. For example, to reference a page that has been created, the following syntax is used:

../../h_View/PageName?OpenDocument

Where: "../../" section at the front of the URL creates a relative URL, is interpreted by the Domino server as referring to the parent objects of the current object (h_View and PageName).

EXAMPLES http://www.mercury.com/register.nsf/Registered+Users/Ja y+Street?OpenDocument http://www.mercury.com/register.nsf/0/466c5172561e1c5c852566c2005f6bbb?OpenDocument Many QuickPlace objects in QuickPlace have internal names beginning with "h_". This is refers to the internal name of QuickPlace which is "Haiku". To reference images, Java Script library files or files other than pages, the following syntax can be used . . .

../../h_Index/Document+Name/$File/Imagename.gif?OpenElement

Or . . .

../../h_Index/Document+Name/$File/ScriptLibName.js?Open Element

Many objects in QuickPlace can be located via the h_Index View. It contains links to many of the published objects in a QuickPlace. When referencing a Java Script file the ?OpenElement argument is used. This is to tell Domino that the file being accessed is not a page to open, which is the default action.

Building URLs: Referencing Images

Figure 6:
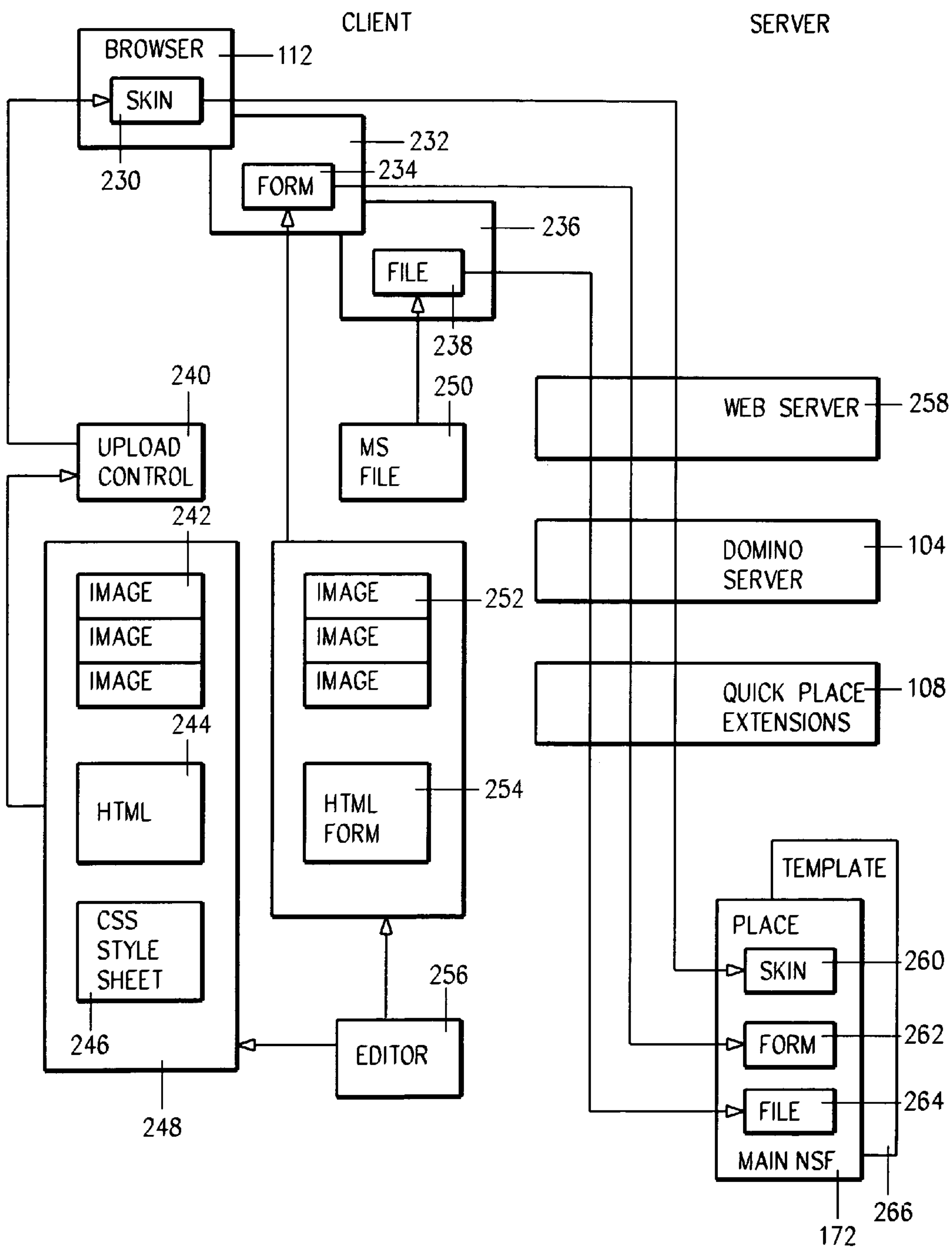
FIG. 6 is a flow chart representation of generation of collaboration space data objects.
Figure 7:
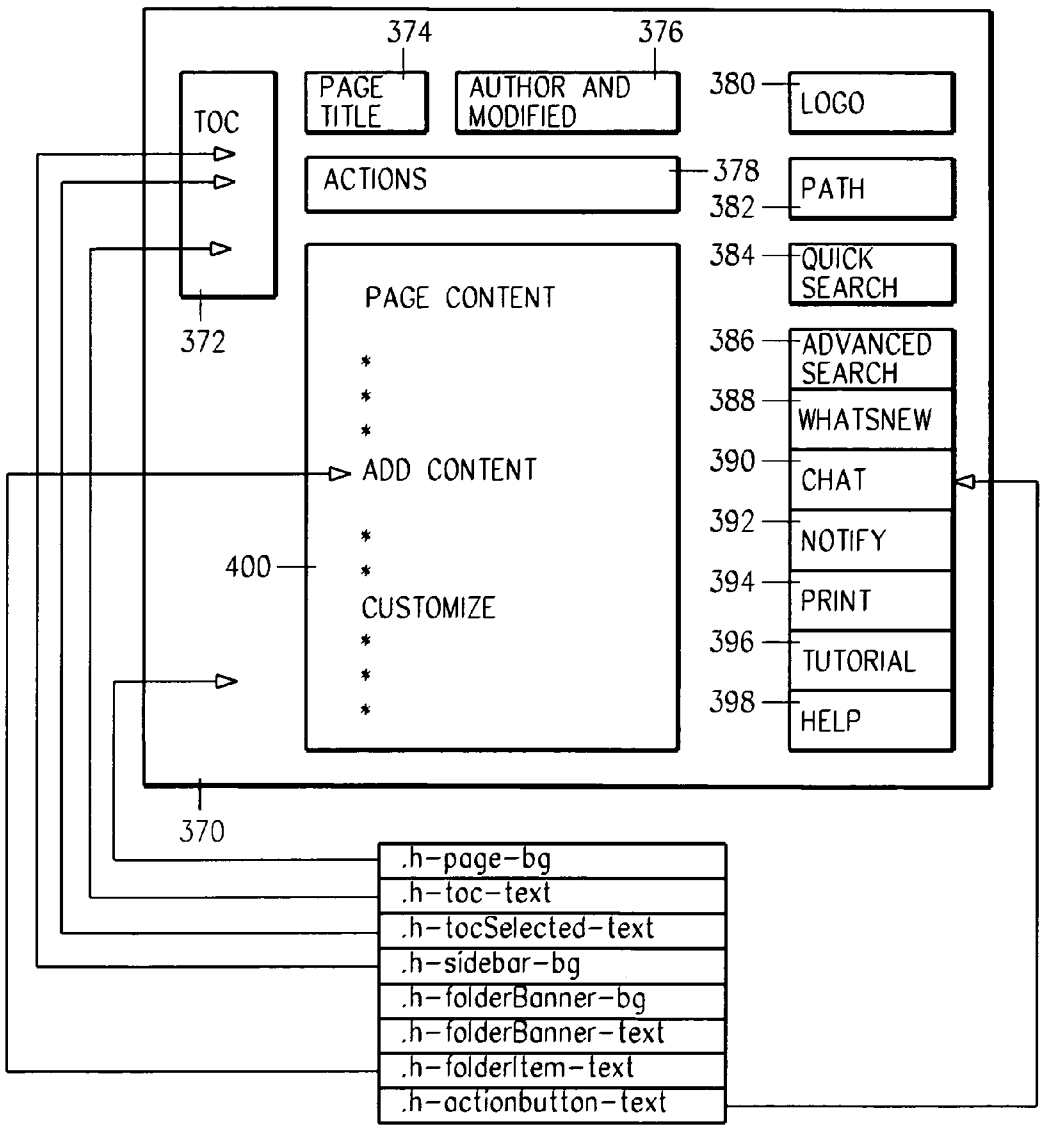
FIG. 7 illustrates a typical collaboration space user is interface.

The following section deals with the issue of using images in QuickPlace. Referring to FIG. 6, due to the fact that QuickPlace is a platform for creating Websites, images 242, 252 form a vital part of the QuickPlace object model. QuickPlace's structure provides many ways to include images in pages. For example when creating skin files 260, the images 242 are automatically uploaded into the QuickPlace 172 when the skin file 230 is uploaded.

Described hereafter are techniques involved for fully automated importing procedures within QuickPlace. An example of an automated importing would be when creating and uploading a Microsoft Word file 250. When this is done the images are imported without any interventions.

There are also instances where some developer intervention is required, such as when creating a Skin file 230, or writing an importable HTML file 254, or referencing files required to display the results of PlaceBot and so on.

Creating skin files are fully described hereafter in connection with themes.

Three methods are used for importing images. These are:

Method 1: Provide a URL to an image and let QuickPlace upload the image. This method is used when creating skins and imported HTML documents that do not use Java Script to reference images.

Method 2: Create a URL, have QuickPlace upload it, then reference it using HTML or Java Script. This method is used when rendering image using Java Script.

Method 3: Manually upload images into a document and reference them via URLs from a separate document. This method is used if the image is very large and it desired to have the user's browsers be able to cache the image; or if the image is referenced within a Java Script function (QuickPlace does not import images when they appear within Java Scripts); or the image is referenced within a PlaceBot which creates new pages.

The solutions selected for a particular application may be a mixture of all three. For example:

Referencing Images: Method 1. Create a Skin file or HTML imported page and let QuickPlace import it. This works in skins and imported HTML, and is the easiest way of importing images into Skins and HTML Pages. When a valid link to an image within an HTML page or a Skin is created, QuickPlace will upload it automatically when the Skin or HTML file is uploaded. For this to work, a valid URL must be created. This may be done as follows:

In the skin file or importable HTML document, download all the images in a local directory. The simplest way to do this is to save them in the same folder as the skin or HTML page. For example, the URL for an HTML file may be:

<img src="transparent.gif" width=5 height=1 alt=" " border="0">

Referencing Images: Method 2. Prompt QuickPlace to import the file into the current document, then reference the file using Java Script. This method is the most efficient method to use when referencing an image via a Java Script function (in a Skin for example) or when updating a document via a PlaceBot.

To force QuickPlace to upload the image, a valid URL to the image at the top of the page must be created. By rendering it in a 1 pixel×1 pixel size, making it too small to see, the image is still uploaded, but the user will not notice the image. The images must also be named when they appear in their 1×1 pixel format. By using this name, the image is made available to Java Scripts below it on the page. This is done by adding the image to the source code near the top of the page. To force QuickPlace to upload the image, it is rendered in HTML format, then the uploaded image referenced in the Java Script.

Overview: Skins, Theme of a Place

In accordance with a preferred embodiment of the invention, skins provide (1) a method for controlling the layout of QuickPlace user interface components, and (2) a method for controlling the style of the Quickplace user interface. Layout defines where components should appear, and look defines font, color, and background images.

Referring to FIG. 6, these are achieved via html pages 244. An html page 244 is imported to the place 172 that describes where each component should fall, and also a style sheet 246 is imported specifying fonts, size, colors.

Each component of a QuickPlace user interface is individually addressable and placed on an html page 244. A style page 246 enables the user to define look by dragging and dropping the html pages and style sheet to the output control 240. A developer can code 256 an html page 244 that addresses the QuickPlace user interface components and style sheet 246 and upload to QuickPlace 172 to convert them into a skin 260.

In accordance with the preferred embodiment of the invention, html pages and style sheets are rendered responsive to QuickPlace tags to allow an end user to import these into a place and instruct that place to use these to instantiate the user interface.

Overview: Place Types

In accordance with a further embodiment of the invention, a QuickPlace may be converted into a template from which new QuickPlaces may be created. In accordance with this method, a QuickPlace is created, including a configuration of membership, forms, PlaceBots and skins to match the needs of team project. The resulting QuickPlace, an entire web site collaborative space, then is converted into a template from which new QuickPlaces can be created with the same configuration.

Skins/Themes

Figure 5:
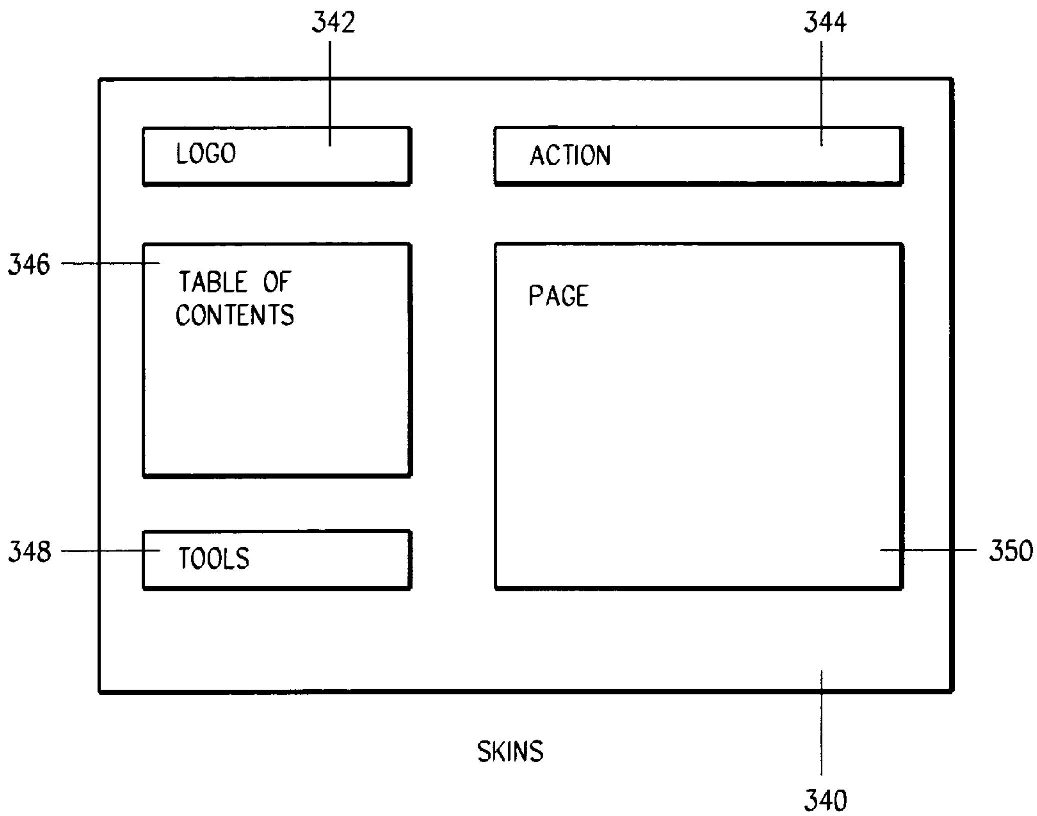
FIG. 5 illustrates the components of a collaboration space user interface.

A skin provides the layout, and look and feel of a QuickPlace. Layout refers to the positioning of components on a page, and which to include. Referring to FIG. 5, the components of a page 340 include logo 342, table of contents (TOC) 346, actions 344, tools 348 and page content 350.

A browser user experiences skins at the QuickPlace user interface. That is, the QuickPlace is presented through a skin, which define the layout of components of a page, and its look and feel (including styling of colors, fonts and images).

There are several audiences for skins (aka, themes). (A skin refers to the user interface embodiment, and a theme to the developer kit embodiment of the same object.) First, end users can choose a theme from a gallery of themes in the UI, allowing them to choose a visual site design to express identity of the team or project, thus to choose a look and feel that suits the work to be done. Second, developers may use a theme to rebrand a QuickPlace for an in house application; to integrate the QuickPlace with other network resources by including a link to a support page; and to integrate QuickPlace seamlessly with an existing web site design.

Thus, skins provide a site template which allow developers to provide themes for embedding of a QuickPlace in a larger web based service. QuickPlace can be used as a team collaboration component of a web site.

A skin or theme is implemented as some HTML code with QuickPlace HTML tags, and a style sheet (CSS, or cascading style sheet), including five HTML layouts and one CSS. In accordance with the preferred embodiment of the invention, skins not only deal with look and feel, but adding links to other resources are used as a development tool both by end users and developers.

Technically, a skin has five designer layouts comprising a skin group which define different display modes supported by QuickPlace, including (1) page read mode, (2) page edit mode, (3) folder list/response, (4) folder headline, and (5) folder slide show.

In accordance with the invention, developers are provided an underlying, server-based architecture which allows caching and dealing with themes. The five layouts and their interaction with the style sheet provide a custom theme user interface, flexibility is defining and selecting user specific themes and client specific themes, decorating by choosing a them, and decorating by tweeking a theme.

A user can choose a theme from a gallery of themes built on top of an underlying themes architecture, which provides the users the ability to subsequently modify the HTML from the user interface. Also, an administrator of a QuickPlace can build customized user interfaces to a corporate style. Tweeking allows users to change basic properties like fonts and colors through a user interface to specific classes in the style sheet. Such a user selects colors and fonts, for example, and QuickPlace feeds those selections into the theme style sheet.

Thus, the underlying themes architecture enables a very simple user interface enabling end users selection and tweeking of themes.

Custom themes provide a powerful user interface to developers. A web developer with HTML and CSS skills can learn to create a theme. A theme is simply HTML and support for Java Applets (logic that processes information and conditionally displays one or a different picture depending upon some decision, such as user group, for example). A custom theme is a simple UI, and upload control, which allows importing of pages into QuickPlaces, has been enhanced to allow developers to pull a theme into a QuickPlace using HTML tags that refer to different components in the layout. The theme is created at the server by QuickPlace, and the user can use the QuickPlace UI at the browser without learning new skills beyond existing web skills.

A user specific theme are used by a program at the server which, upon detecting the identity of the browser user, selects the theme for that user. An example would be an accessibility theme tailored to the reading machines that blind people use. In such a case, the server would provide to the browser a user interface which is nicely structured with content that reading machines can use.

A client specific theme has application, for example, with a personal computer or palm pilot, by which the server provides a PC or Palm specific theme. A theme specify XML content, which allows for selective processing of the QuickPlace: a theme skin in html can act on that content differently. xml allows for logic to be applied to the content of the QuickPlace.

Tweaking and choosing themes use existing browser functions, with a layouts architecture mapped to skin components. This allows for tweaking of custom themes. Each piece of the user interface is implemented as a component. The style sheet controls style, and tweaks only modify the style sheet (not the layout).

Figure 9:
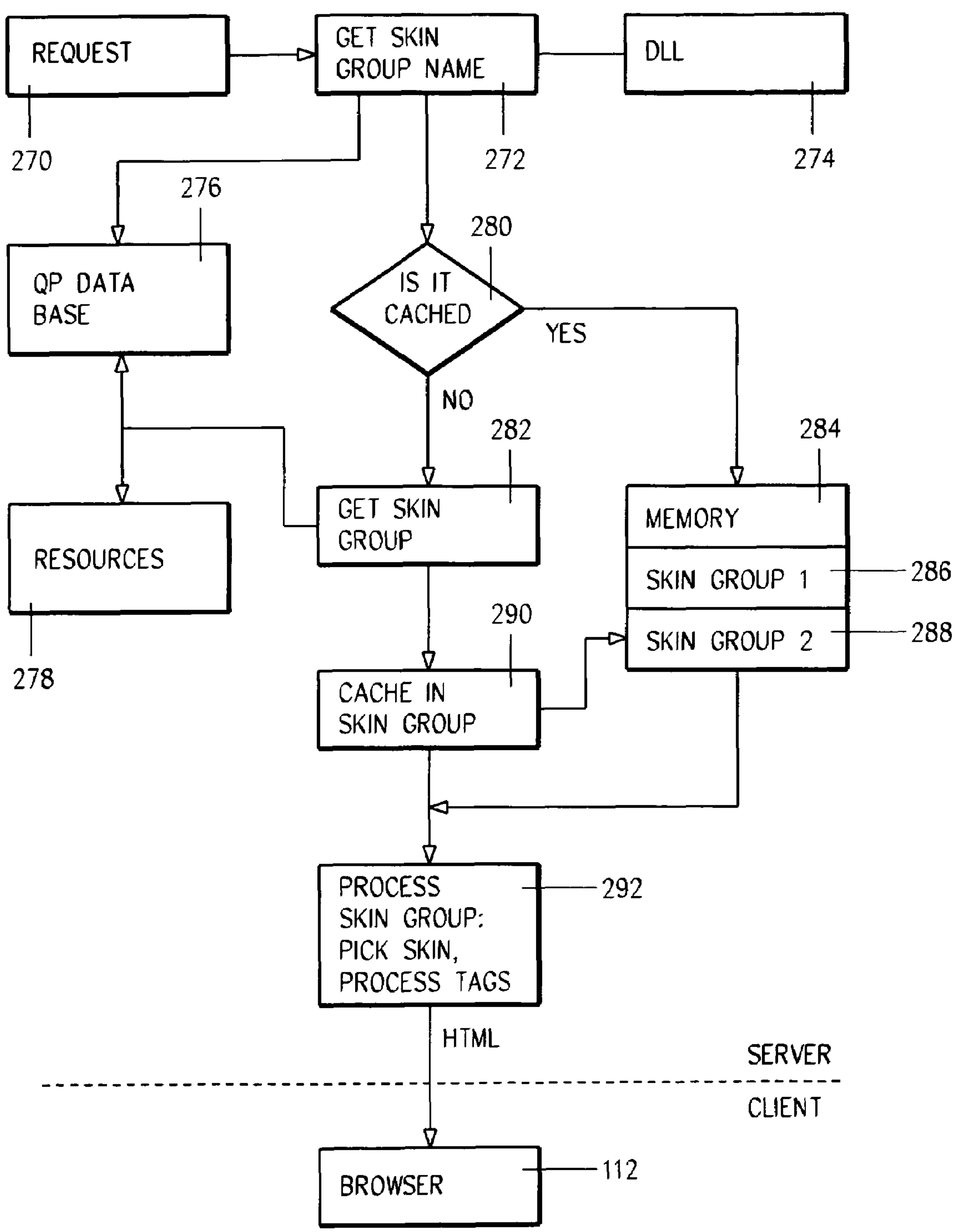
FIG. 9 is a combined flow chart and system diagram illustrating the rendering of a user interface and the caching of skins.

Referring to FIG. 9, the method of an exemplary embodiment of the invention for rendering a QuickPlace to a browser user interface is set forth. Responsive to a request 270, first with respect to the HTML, the server checks database 276 for the appropriate skin name, allowing also for access to DLL 274 for the user to select his own theme.

In step 280, the server determines if the selected skin is a skin group 286, 288 cached in memory 284. If so, in step 292 the selected skin group is processed to produce the HTML, including picking the skin and processing the tags, which are then sent to browser 112.

If in step 280 it is determined that the required skin is not cached, in step 282 the server accesses database 276 to retrieve the skin group, checking the current database and parents in order (through nested databases in a room). If the skin is not located in database 276, server goes to resources 278, which are shared across QuickPlaces. Upon finding the skin group, in step 290 it is cached to memory 284, and processed in step 292 as discussed above.

For the style sheet, the processing is a little different. The QuickPlace server builds four pieces: common style sheet, skins style sheet (from FIG. 9 processing), and tweaks that affect the style sheet. The color set is found in resources 278, and tweaks are picked from database hierarchy 276.

See print screen version of table of contents of devzone description of skins.

Customizing QuickPlace Themes with HTML

As previously noted, a QuickPlace theme controls the look and the layout of a QuickPlace—that is, its fonts and background colors, how an element looks when it is selected, where the navigational controls appear, and so on. When creating a QuickPlace, a theme may be selected by choosing from a gallery of predefined themes, an existing theme may be selected, or a new theme created.

Using a custom theme can give a new QuickPlace a strong brand identity, designing it to look like other corporate sites, or supplying additional functionality as well as a unique look.

Custom Themes and HDML

Themes are implemented using the QuickPlace skins architecture and are defined using HTML 244, so to customize a theme, the HTML 244 is created or modified using any HTML editor 124 and then the modified files uploaded to QuickPlace. QuickPlace provides a set of custom HTML tags to use to define the elements in each layout. A skin, therefore, comprises HTML and QP tags.

When customizing a theme, all of the power of HTML is available to add functionality to a QuickPlace. Following are some ways to enhance a QuickPlace using custom themes:

1. Apply the corporate brand identity to a QuickPlace or create a custom graphic identity for a collaborative application.
2. Integrate a QuickPlace seamlessly as a collaborative component within a larger corporate Web site.
3. Provide links from a QuickPlace to other Web sites such as corporate Web sites, eCommerce sites, or to customer support services.
4. Make new features available by embedding ActiveX controls or Java applets in the custom theme.
5. Use Java Script to program dynamic effects into the custom theme.

Custom Themes and Place Types

When a theme is customized, it may be kept as part of a template from which to build similar QuickPlace applications. To do this, the QuickPlace is saved containing the custom theme as a custom Place type, which can then be used for creating new QuickPlace applications.

Anatomy of a QuickPlace Theme

Each theme is composed of a group of layouts that define the appearance of specific QuickPlace components. For example, the layout for a page differs from the layout of a folder, but they will probably share some style elements as part of a common theme. Table 18 sets forth the layouts and style sheet of a QuickPlace theme.

TABLE 18

SKIN GROUP COMPONENTS

| Layout | File type | Purpose |
|---|---|---|
| Page | .htm | Defines the appearance of a page being read |
| Page editing | .htm | Defines the appearance of a page being edited |
| List folder | .htm | Defines the appearance of a List or Response folder |
| Headlines folder | .htm | Defines the appearance of a Headlines folder |
| Slideshow folder | .htm | Defines the appearance of a Slideshow folder |
| Stylesheet | .css | Defines styles such as fonts and colors for all layouts |

In most cases, a single theme can be used to customize the look of page, list folder, and slideshow folder. Additonally, JPEG or GIF graphic files can be imported to represent a theme in the Custom Theme Gallery.

Table 19 shows the components that can be customized for each layout.

TABLE 19

CUSTOMIZABLE LAYOUT COMPONENTS

| Component Name | Page | List folder | Slideshow folder | Headlines folder | Edit |
|---|---|---|---|---|---|
| Logo | x | x | x | x | x |
| Page content | x | x | x | x | x |
| Actions | x | x | x | x | x |
| Help | x | x | x | x | x |
| Table of Contents | x | x | x | x | |
| Path | x | x | x | x | |
| QuickSearch | x | x | x | x | |
| WhatsNew | x | x | x | x | |
| AdvancedSearch | x | x | x | x | |
| SignIn | x | x | x | x | |
| Offline | x | x | x | x | |
| Chat | x | x | x | x | |
| Notify | x | x | x | x | |
| Print | x | x | x | x | |
| Tutorial | x | x | x | x | |
| PageTitle | x | x | | Note 1 | x |
| Navigation | x | x | x | Note 2 | |
| Jump | Note 3 | x | x | Note 2 | |
| AuthorandModified | x | Note 3 | x | x | |
| Revision | x | Note 3 | x | x | |
| HeadlinesFolder | | | | x | |

Notes:
1. Although the PageTitle component can optionally be included in a Headlines folder, this component would normally be omitted and the page title displayed prominently instead.
2. The Headlines Folder is designed to provide a headlines style of navigation in place of the previous/next navigation used in other folder types. Therefore, the Navigation and Jump components are not normally used in the Headlines Folder layout.
3. The Jump component can be included in the Page layout and the AuthorAndModified and Revision components in the ListFolder layout. These components will all display as "empty", using the HTML parameter emptyFormat.

Modifying an Existing Theme

In accordance with a preferred embodiment of the invention, a QuickPlace theme is customized by beginning with the theme closest to what is desired, extracting the HTML source files for the theme, customizing them, and uploading the modified files as a custom theme.

This process is as follows, from the QuickPlace user interface:

1. Choose Customize—Decorate—Click here to choose a theme.
2. Select the theme that most closely represents the look and layout desired for the QuickPlace and click the Done button.

QuickPlace applies the selected theme. The user then proceeds:

3. Select Customize—Custom Themes—New Theme.
4. Enter a name for the theme you being created and click the Done button.

QuickPlace returns to the Custom Themes page.

5. Click the theme name specified in step 4 to edit it.

QuickPlace displays the Edit Theme page with a file associated with each layout.

Viewing an HTML File

To view or modify the source code for a layout, the file is dragged to the desktop and opened in an HTML editor. If using an editor such as HomeSite that supports in-place editing, right-click a file name and choose the editor from the right-click menu. This opens the editor within QuickPlace. Changes you made to the HTML file are automatically uploaded when saving and exiting the editor.

The original source file can also be modified in an HTML editor, and the Reload button clicked from the Edit Theme page to reload the modified file.

Creating a Custom Theme

To create a custom theme, the existing layout files are modified or new layout files created. In either case, a name is assigned and the layout files upload. The procedure is as follows:

Modifying Layout Files

1. Choose Customize—Custom Themes
2. Click the New Theme button.
3. Enter a title and an optional description for the new theme.
4. Choose a layout to modify and click the Browse button to locate the HTML file for the layout.
5. Select the file from the file system and click OK to upload the .htm file for the layout.
6. Repeat to upload files for other layouts or for the theme style sheet.
7. Click the Done button to save the custom theme.

Generating Layout Files

As a theme is developed, QuickPlace can take the code from one layout and apply it to all layouts for which a file has not been explicitly supplied. This is a shortcut for applying a common look and feel to multiple layouts.

This feature also allows one to develop a custom theme in stages, replacing generated layouts with custom files as the theme progresses.

To generate layout files based on a layout:
1. Choose a layout and click the Browse button to locate the HTML file for the layout.
2. Select the file from the file system and click OK to upload the .htm file for the layout.
3. Click the Generate button to populate the other layouts with files based on this file.
4. Modify the generated files as desired.
5. Click Reload to upload a modified file.
6. Click the Done button to save the custom theme.

Creating Layout Files Using the QuickPlaceSkinComponent Tag

The HTML tag that controls the style and placement of elements in a QuickPlace layout is the <QuickPlaceSkinComponent tag>. The basic syntax for the <QuickPlaceSkinComponent> tag is as follows:

```
Syntax
    <QuickPlaceSkinComponent
      name="<skincomponentname>" (required)
      format="<format html>" (optional)
      selectedformat="<format html>" (optional)
      emptyformat="<html>" (optional)
      delimiter="<html>" (optional)
      prefixHTML="<html>" (optional)
      postfixHTML="<html>" (optional)
      replaceString="STRING_1=REPLACEMENT_1 && ... && ..."
          (optional)
    >
```

Table 20 sets forth skin component tag attributes.

TABLE 20

SKIN COMPONENT TAG ATTRIBUTES

| Attribute | Description |
|---|---|
| name | Required. Specifies the name of the theme component being modified. Valid names are described below. |
| format | The format HTML. The keyword &ltIteratingValue . . . > is replaced for each relevant entry |
| selectedformat | Same as format but it applies to the selected value. For example, the format of the selected TOC entry or the selected headlines folder entry. |
| emptyformat | What is returned when there are no values to iterate over. |
| delimiter | The HTML placed between each of the items in a list of values. |
| PrefixHTML | The HTML placed before each of the values in a list. |
| PostfixHTML | The HTML placed after each of the values in a list. |
| Replacestring | Finds and replaces one or more strings with replacement stings. |

Component name
The name attribute can be one of the following:

Actions
Chat
Help
Logo
Notify
Search
SignIn
Path
TOC
Navigation
Jump
PageTitle
WhatsNew
Revision
HeadlinesFolder
PageContent -- only supports the name attribute
Usage The <QuickPlaceSkinComponent> tag identifies a element or piece of the QuickPlace user interface for which to modify the look and placement. Customize the look and functionality of a QuickPlace application is done by modifying various elements and adding HTML or Java Script within the <QuickPlaceSkinComponent> tag.

The attributes PrefixHTML, PostfixHTML, Emptyformat, and Delimiter work together to help control what displays in a particular context. For example, an HTML string may to offer a set of instructions that go with a set of action buttons. When the action buttons are hidden, the text should be hidden as well.

EXAMPLE

This example defines the layout and style of a Table of Contents.

```
<QuickPlaceSkinComponent
Name=TOCSkinComponent
Format="<tr class=h-tocRow-bg><td class=h-tocColumn-bg><Item class=h-toc-text></td></tr>"
EmptyFormat="<tr class=h-tocRow-bg><td class=h-toc-Column-bg></td></tr>"
SelectedFormat="<tr class=h-tocSelectedRow-bg><td class=h-tocSelectedColumn-bg><Item class=h-tocSelected-text></td></tr>"
>
```

Using the Item Tag

Many of the components will contain a list of values, such as the items in a Table of Contents. In these cases, the HTML tag <Item> within the <SkinComponent> tag is used to iterate through the values in a list.

Syntax

<Item
attribute="anchor|anchor.href|anchor.text|anchor.selected" (optional)
class="class name" (optional)
> where attribute is all or part of a fully qualified HTML link for the item in a list, and class is the name of the class defined in an associated style sheet. The class name is inserted into the anchor information for the item.

The attribute describing the HTML link can take one of the following forms:

anchor returns all of the HTML that describes the item, including the URL, and associated text. For example, lotus.

anchor.href returns the URL for the value. For example, "www.lotus.com"

anchor.text returns text associated with the value, for example "lotus."

anchor.selected returns true if the value is selcted, false if it is not.

T <Item> tag is used to select a value in a list. The attribute for the value identifies all or part of the HTML link that describes a particular value in a list. Use the class attribute to add styles defined as a class in an associated style sheet.

EXAMPLE

This example defines the look and style of a Table of Contents.

<QuickPlaceSkinComponent
name=TOCSkinComponent
Format="<tr class=h-tocRow-bg><td class=h-tocColumn-bg><Item class=h-toc-text></td></tr>"
EmptyFormat="<tr class=h-tocRow-bg><td class=h-toc-Column-bg></td></tr>"
SelectedFormat="<tr class=h-tocSelectedRow-bg><td class=h-tocSelectedColumn-bg><Item class=h-tocSelected-text></td></tr>">

Using HTML

Because the Page, ListFolder, and Slideshow layouts share so many common components, one HTML file that applies styles to these three layouts can be created. HTML for the Slideshow Folder is created, which contains the superset of components used in the three layouts. To control how the non-applicable components display for a layout—for example, the Jump component for the Page layout, and the AuthorAndModified and Revision components for the ListFolder—various results are achieved by setting the emptyFormat, prefixHTML, and postfixHTML parameters.

For example, to have the empty components occupy the same vertical space as they do when in use, set the parameter as follows:

emptyFormat=" "

By placing each component in a separate table row, the component's row "collapse" when it is empty, so that it occupies no space. Given that the prefixHTML and postfixHTML parameters are not output when the component is empty, these parameters can be used to provide the following table structure:

emptyFormat=" "
prefixHTML="<tr><td>"
postfixHTML="</td></tr>"

Style Sheet Selectors in QuickPlace

Referring to FIG. 5, a typical QuickPlace user interface 370 includes a sidebar (TOC) 372, page title 374, author and modified field 376, actions bar 378, logo 380, path 382, page content 400, and actions buttons, such as quick search 384, advanced search 386, what's new 388, chat 390, notify 392, print 394, tutorial 396 and help 398. Each of these is customized by using tags or selectors which deal with borders, background, text, and so forth, in accordance with a style sheet.

A standard default style sheet is always output with any theme, so that one need only to specify the selectors that are to be changed. Undefined properties will fall back to those defined in the default style sheet.

Tables 21 through 26 describe Style Sheet (CSS) Selectors.

TABLE 21

Style Sheet Tags

| CSS Selector | Description and Notes |
|---|---|
| body, td | Default text style. Note: specify both tags to set the default text style. |
| a | Anchor style. Note: see also several other more specific anchor styles, below. |
| a:hover | Default style of anchors when mouse is over the anchor. Note: IE only. |
| form | Default style of forms. Note: The margin-bottom property is set to 0px by default to remove unwanted whitespace from the bottom of all forms. |

(Note:
Other tags, such as h1, h2, etc., can also be styled as needed.)

TABLE 22

Page Background

| CSS Selector | Description and Notes |
|---|---|
| .h-page-bg | Page background. Note: class assigned to body tag of all pages. For IE only, the margin properties can be set to control the page margin. |

TABLE 23

Text and fields in Page layout

| CSS Selector | Description and Notes |
|---|---|
| .h-field-text,<br>.h-field-text td | Style of the text value of a field. Note: use this exact selector, as shown, to style field text distinctly from regular page content. |
| .h-pageSmall-text | "Smallprint" page text. |
| .h-fieldSmall-text | "Smallprint" text content of fields. |
| .h-fieldHeader-bgtext | Field header. |

TABLE 23-continued

| Text and fields in Page layout | |
|---|---|
| CSS Selector | Description and Notes |
| .h-fieldOrder-bgtext | Number to the left of the field header. |
| .h-page-text a:visited | Anchors inside the pageContent skin component which have been visited. Note: IE only. |

TABLE 24

| Edit Layout | |
|---|---|
| CSS Selector | Description and Notes |
| .h-fieldHeaderEdit-bgtext | Field header |
| .h-fieldEdit-text, .h-fieldEdit-text td | Field description text. Note: use exact selector, as shown. |
| .h-fieldOrderEdit-bgtext, .h-fieldOrderEdit-bgtext | div td Number to the left of the field header. Note: use exact selector, as shown. All properties in this selector must be marked ! important to take effect. E.g., color: green! important. |
| .h-fieldSmallEdit-text | Small field text. Note: all properties in this selector must be marked ! important to take effect. |
| .h-fieldSpecialEdit-text | Special field text. Note: used in Task Info field. All properties in this selector must be marked! important to take effect. |

TABLE 25

| QuickSearch | |
|---|---|
| CSS Selector | Description and Notes |
| .h-searchField-text | Style of the text field associated with the quickSearch skin component. |

TABLE 26

| Classes defined by the default theme The classes listed below are not built into QuickPlace, but are defined by the default theme's stylesheet. (Custom themes are not required to use these classes, and are free to define any other classes as appropriate.) However if modifying the default theme, these classes can be modified to get a particular effect. | |
|---|---|
| CSS Selector | Description and Notes |
| .h-logo-text | Logo text. |
| .h-heading-textbg | Heading about table of contents and tools boxes. |
| .h-sidebar-bg | Background of table of contents and tool boxes. |
| .h-toc-text | Text of item listed in table of contents. |
| .h-tocSelected-text | Text of selected item listed in table of contents. |
| .h-nav-text | Navigation link. |
| .h-tool-text | Tool link. |
| .h-signIn-text | Sign In link. |

TABLE 26-continued

| Classes defined by the default theme The classes listed below are not built into QuickPlace, but are defined by the default theme's stylesheet. (Custom themes are not required to use these classes, and are free to define any other classes as appropriate.) However if modifying the default theme, these classes can be modified to get a particular effect. | |
|---|---|
| CSS Selector | Description and Notes |
| .h-actionButtonBorder-bg | Border of action button. |
| .h-actionButton-bg | Background of action button. |
| .h-actionButton-text | Text of action button. |
| .h-actionSpace-text | Space between action buttons. |
| .h-pageTitle-textbg | Page title. |
| .h-pageAuthorMod-text | AuthorAndModified text. |
| .h-revision-text | Revision link (draft \| published). |
| .h-revisionSelected-text | Selected revision link |
| .h-accent-bg | Accent color. E.g., used in rule at bottom of page. |
| .h-headlineFolderTab-bg | Background of unselected tab in headline folder. |
| .h-headlineFolderTab-text | Text of unselected tab in headline folder. |
| .h-headlineFolderTabSelected-bg | Background of selected tab in headline folder. |
| .h-headlineFolderTabSelected-text | Text of selected tab in headline folder. |
| .h-edit-bg | Background of edit layout "docket". |
| .h-actionButtonEdit-text | Text of action button in edit layout. |
| .h-actionButtonBorderEdit-bg | Border of action button in edit layout. |
| .h-actionButtonEdit-bg | Background of action button in edit layout. |
| .h-shadow-bg | Shadow. Note: used in sidebar and in edit layout "docket" shape. |
| .h-shadowCorner-bg | "Missing" corner of shadow area. |

File System Directory Architecture

Figure 8:
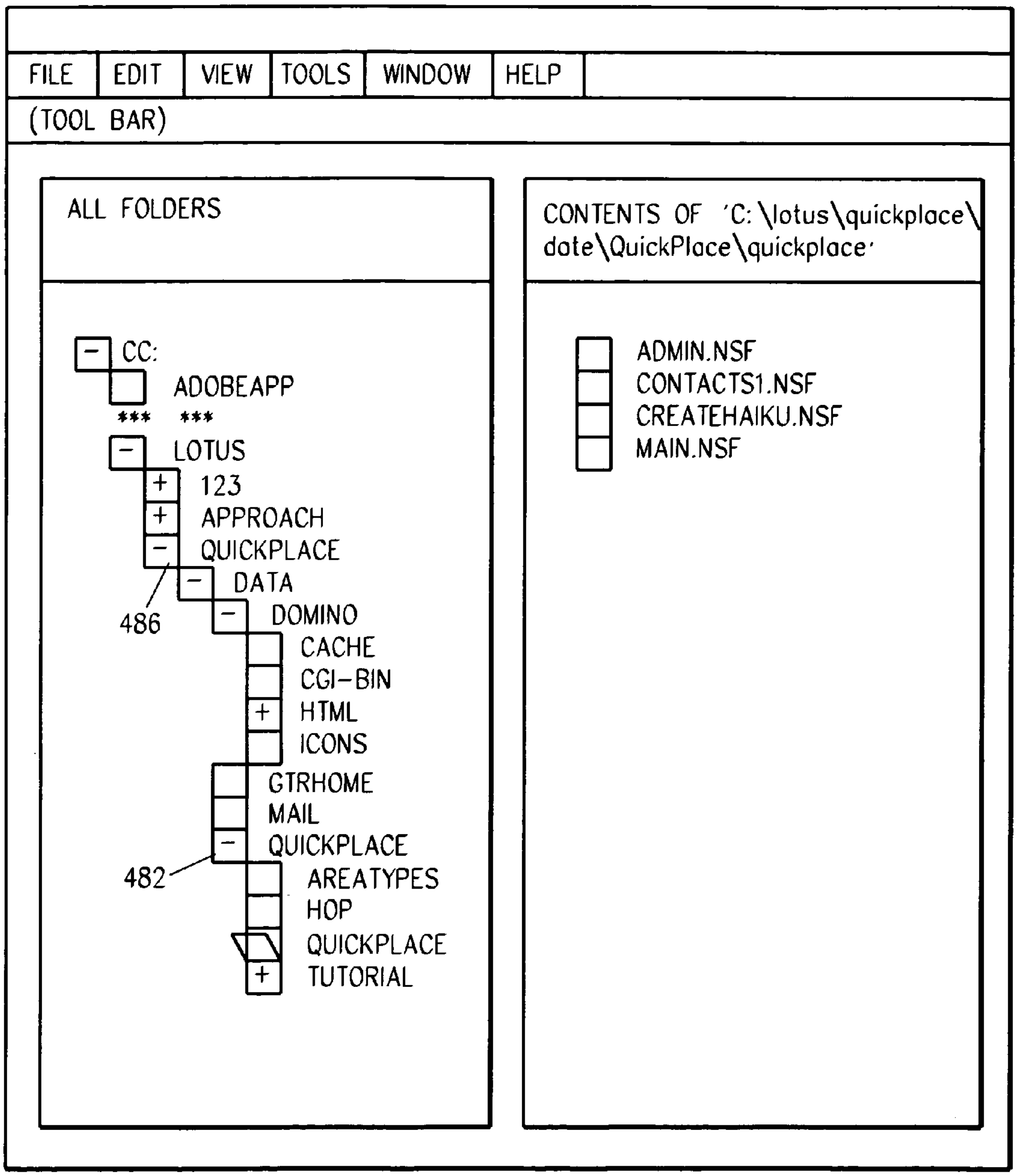
FIG. 8 is a schematic representation of a directory structure, along with the files in an exemplary collaboration space server.

In accordance with the preferred embodiment of the invention, every new QuickPlace created gets its own directory under the QuickPlace master directory. The name of that directory is same as the name of the QuickPlace. Each additional room in the QuickPlace is another file (.nsf) in the QuickPlace directory. During the QuickPlace server installation, the default QuickPlace (also called the "Welcome" QuickPlace) with the name of QuickPlace is automatically created. This is the entry point to the QuickPlace server including the server administration. FIG. 8 shows the directory structure, along with the files in "Welcome" QuickPlace, in a stand-alone QuickPlace server.

For example if Millennia is the a current QuickPlace, then the basic infrastructure of the Millennia QuickPlace resides under \lotus\domino\data\quickplace\millennia (on Domino server—given that \lotus\domino\data is the data directory) or \lotus\quickplace\data\quickplace\millennia (on stand-alone—given that \lotus\quickplace is the QuickPlace installation directory).

When QuickPlace server is installed, the "Welcome" region or the "Administrator's Place" is pre-configured to allow an entry point to the QuickPlace server. An administrator can then administer the newly installed QuickPlace server from this entry point. This so called administrative QuickPlace resides under the QuickPlace directory which in turn is under the data directory. For an example it is c:\lotus\domino\data\QuickPlace\QuickPlace when installed under Domino, and c:\lotus\QuickPlace\data\QuickPlace when in stand-alone mode. It contains the following files: Main.nsf, Contacts1.nsf, CreateHaiku.nsf, Admin.nsf. The templates for these Domino databases reside in the directory named AreaTypes. The "Welcome" page may be configured to suit the needs of an organization.

Customizing QuickPlace: Templates (AreaTypes or Place Types)

Some QuickPlaces can be reused over and over again. For example, a QuickPlace to track a project. To avoid tailoring each QuickPlace from scratch, popular QuickPlaces can be saved as templates called Place types in the QuickPlace environment.

Figure 11:
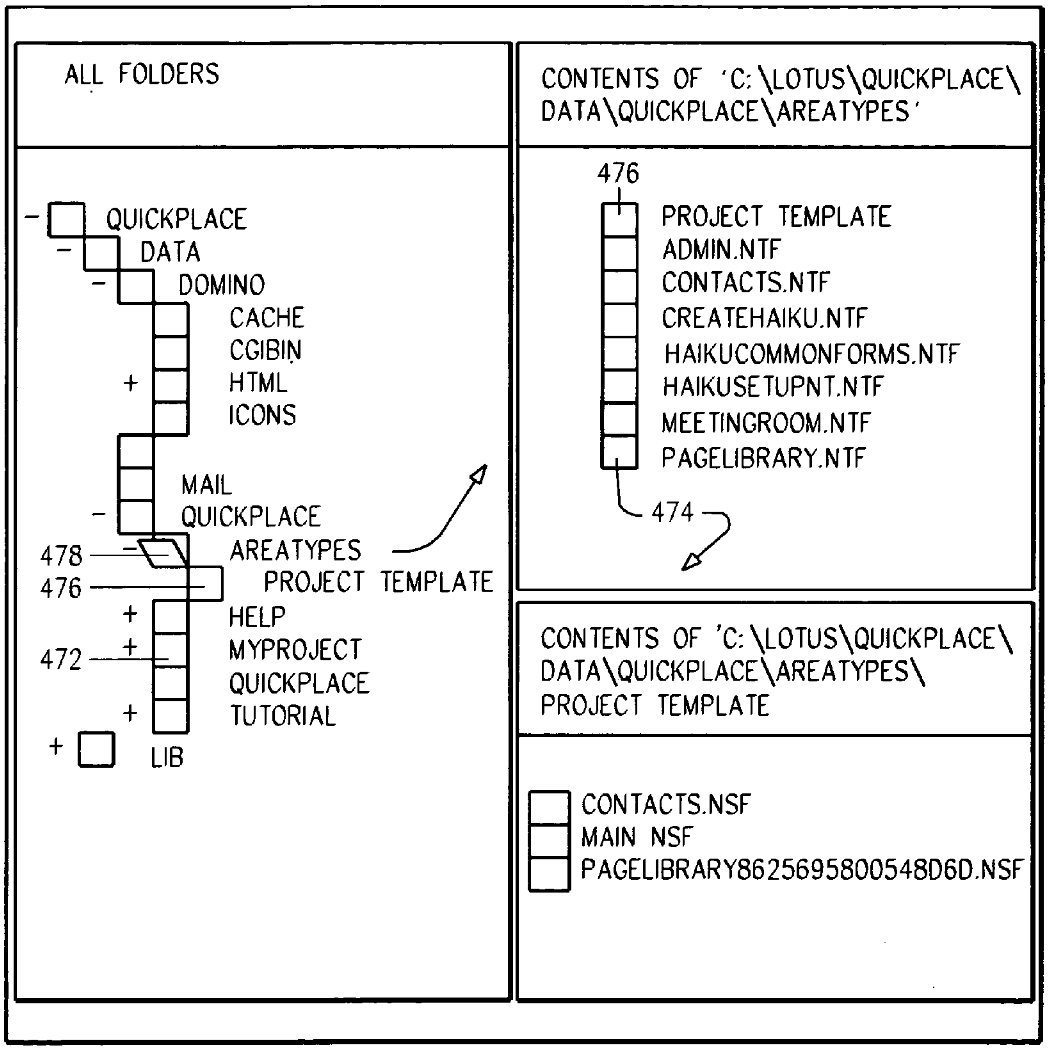
FIG. 11 illustrates a user interface showing the directory structure of a collaboration space place type.

Referring to FIG. 11, by way of example, assume a QuickPlace called MyProject 472 is created with one room, called "Status Meeting", that has created a PageLibrary 474 file. Each room resides in its own PageLibrary file. The newly created Place type gets its own directory 476 under AreaTypes 478. FIG. 11 also shows the default Domino template files (.ntf) 480 that the QuickPlace server uses to create, when demanded by the end-users, all the subsequent QuickPlaces. Help and Tutorial QuickPlaces which were created during the installation process also use some of the same templates.

Places

Figure 12:
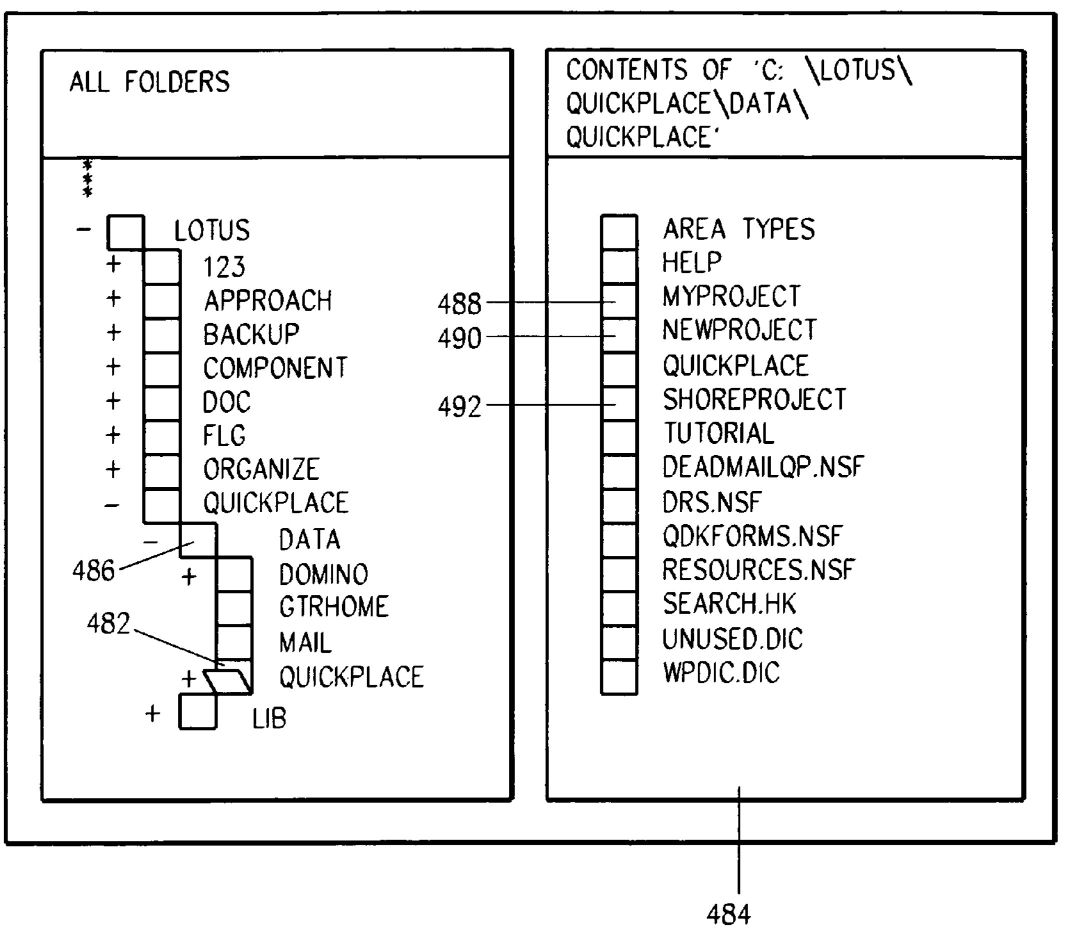
FIG. 12 illustrates a user interface showing the directory structure of collaboration space places.

Referring to FIG. 12, places are the QuickPlaces administrators and users create on the server. Each QuickPlace gets a new directory 484 under the <data>\QuickPlace directory 482. In the example of FIG. 12, the default directory is used during a stand-alone QuickPlace server installation and that is c:\Lotus\QuickPlace\data 486. Three QuickPlaces have been created thereunder—MyProject 488, NewProject 490 and ShoreProject 492.

Security

The security can be controlled at two levels: (1) from the server's administration perspective—Managing the QuickPlace server; and (2) from each QuickPlace's perspective—Managing a QuickPlace.

A server administrator can restrict who can create a new QuickPlace on the server and also who can administer the QuickPlace server. The SSL encryption can also be controlled by the server administrator. The SSL encryption is effective server wide and cannot be controlled at a QuickPlace level. All this can be accomplished via security screen. At the QuickPlace level, the administrator can control who can read the information, which users can create the information, and who can administer the particular QuickPlace. Anonymous allows everyone access without authentication.

Working with QuickPlace Place Types

An existing QuickPlace may be used as a model, or template, for a new QuickPlace. A QuickPlace used as a template for a new QuickPlace is called a Place type. For example, suppose a QuickPlace named "Meeting Place" is created and decorated that includes two pages, a folder called Issues, and an inner room. When Meeting Place is designated as a Place type on the QuickPlace server, users with the proper access can create one or more identical copies of Meeting Place, each including copies of the two pages, the Issues folder, and the inner room in the original Meeting Place. If Meeting Place is set up to allow it, a user who uses the Meeting Place Place type to create a new QuickPlace can then modify the new QuickPlace just as they would one they created "from scratch."

To create a QuickPlace using a Place type, a user clicks Create a QuickPlace, selects the name of the Place type from a list, and enters the name for the new QuickPlace, a user name, and a password. A manager of a QuickPlace designated as a Place type may limit the types of changes QuickPlace creators can make in QuickPlaces based on that Place type. For example, the manager of a QuickPlace called Marketing Projects could dictate that the Decorate options not appear in any Place type based on the Marketing Projects QuickPlace.

In accordance with a preferred embodiment of the invention, collaboration space users may:

1. Create a Place type.
2. Create a description of a Place type for the list of Place types. QuickPlace creators see when they begin to create a QuickPlace
3. Display source information for a Place type, for example, the name and address of the QuickPlace on which the Place type is based.
4. Edit the Place type description
5. Hide or redisplay the names and descriptions of Place types in the list of Place types QuickPlace creators see.
6. Reorder the names of Place types in the list of Place types QuickPlace creators see.
7. Update a Place type when the QuickPlace on which the Place type is based changes.
8. Copy a Place type from one server to another.
9. Add a Place type copied from another server to the list of Place types on the current server.
10. Delete a Place type.
11. Update a Place type-based QuickPlace when the Place type changes.

Creating a Place Type

To create a Place type based on a QuickPlace on the current QuickPlace server:

1. In the Address or Location box in the browser, enter the address of the QuickPlace server.
2. Click SignIn in the top right corner of the QuickPlace window.
3. Enter the user name and password used when QuickPlace was first installed on the server.
4. Click Place types in the sidebar.
5. Click Create Place type.
6. Enter a name for the Place type. The name entered here appears in the list of Place types a user sees when he or she clicks Create a QuickPlace to begin creating a QuickPlace.
7. Select the name of the QuickPlace to use as a Place type.
8. Click Next.

Creating a Place Type Description

Figure 13:
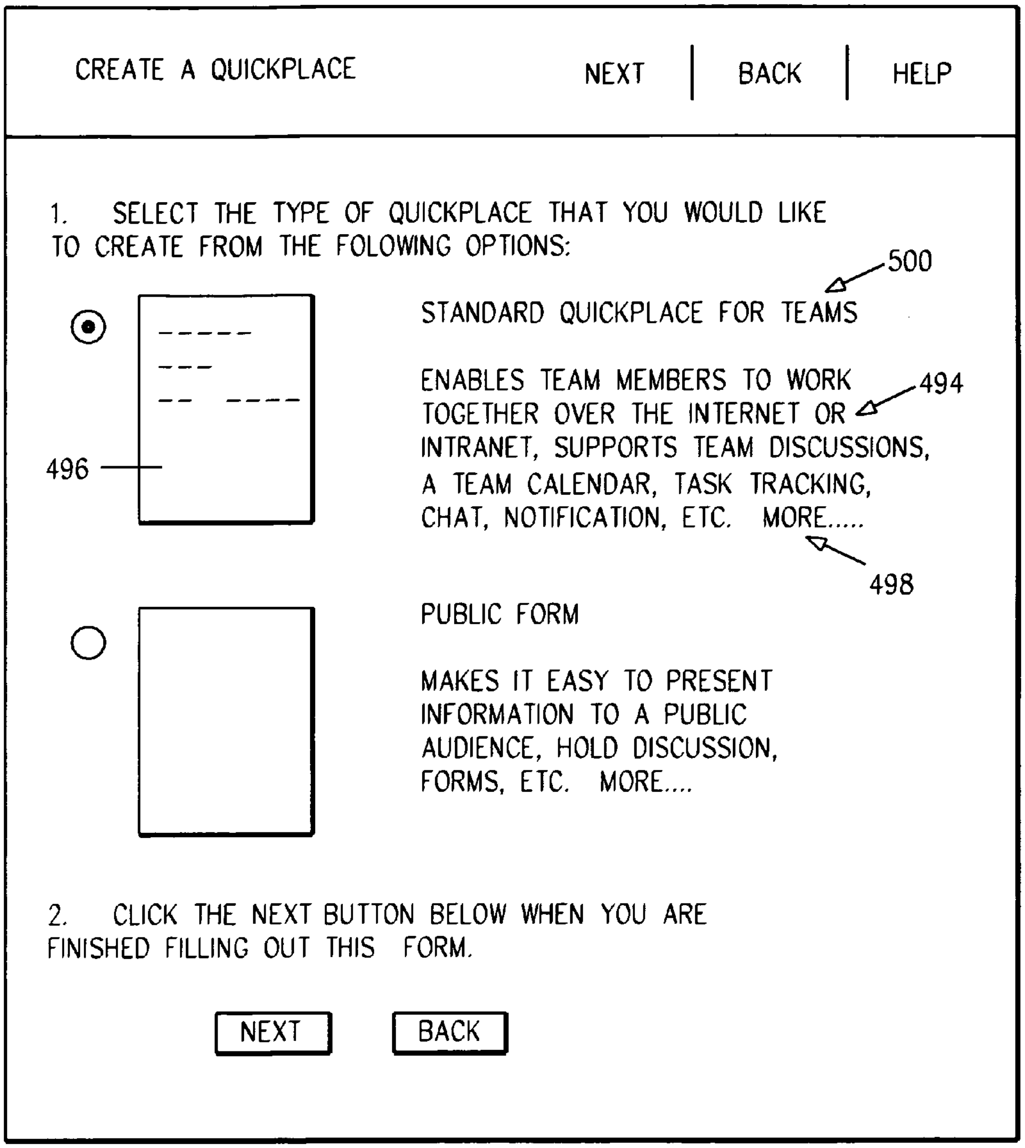
FIG. 13 illustrates a user interface showing descriptions provided of selectable place types.

Referring to FIG. 13, when a user clicks Create a QuickPlace on a server that includes multiple Place types, a list of Place type names appears on the screen. To help the user understand the Place type choices available to him or her, a list is set up such that some or all of the references to Place types include one or more of the following: a two- or three-line description 494 of the Place type; a thumbnail sketch of the Place type 496; and a link 498 to another Web page that includes a more detailed description of the Place type. The manager of a QuickPlace can also create a description for the Place type to be derived from his or her QuickPlace. If the manager of a QuickPlace has already created a description for the Place type for his or her QuickPlace, one who subsequently uses that Place type cannot edit the description.

A Place type description is created as follows:

1. In the Address or Location box in the browser, enter the address of the QuickPlace server.
2. Click SignIn in the top right corner of the QuickPlace window.
3. Enter the user name and password used when QuickPlace was first installed.
4. Click Place types in the sidebar.
5. Click the name of the Place type for which a description is to be created.
6. Click Edit.
7. Under "Update this Place type with the latest changes from QuickPlace name," click "No, simply update the information below."
8. Enter a two or three line description 494 of the Place type. The description appears next to the Place type name 500 in the list of Place types a user sees when he or she clicks Create a QuickPlace. For example, one could enter the text, "Supports team members who want to meet in a secure space on the Internet. Includes a folder called Action Items and an inner room called Design Proposals."
9. Choose an image file that contains a "thumbnail sketch" 496 of a page in the Place type. The image file must be an .GIF or .JPG file, and the image itself should be small—no larger than 100 pixels by 80 pixels. The thumbnail sketch 496 appears next to the Place type name 500 in the list of Place types a user sees when he or she clicks Create a QuickPlace.

Click Browse.

In the dialog box that appears on the screen, choose the folder that contains the image file to use, and then select the name of the file.

In the dialog box on the screen, click Open.

10. If QuickPlace creators are to be given more information about the Place type than can be supplied in the description box 494, create a separate QuickPlace that contains, for example, an entire page that describes the Place type, and then specify the address of that page under "Optionally, you can provide a URL for users to visit for more information." When the address of a Web page is specified, QuickPlace displays the link text "More info" 498 below the description 494 of the Place-Type in the list of Place types. When a user clicks the link, QuickPlace displays the contents of the Web page at the address specified.

If the Web page that contains the detailed information is on the current QuickPlace server, enter an abbreviated address that begins with a/(forward slash). For example, if the current QuickPlace server is called TestServer and the address /QuickPlace/acme/main.nsf is entered, the address will be interpreted as http://testserver/quickplace/acme/main.nsf.

If the Web page that contains the detailed information is on another server, the full address of the Web page is entered. For example, if the Web page is the Welcome page in a QuickPlace called Acme on a server called HighTestServer, one would enter the address http://hightestserver/quickplace/acme/main.nsf.

11. Click Next.

Displaying Source Information for an Existing Place Type

One can display the name and address of the QuickPlace on which an existing Place type is based. If a description is provided for the Place type, the description appears when displaying source information for a Place type. One cannot display source information for the default Place type. The default Place type is the Place type QuickPlace installs automatically when installing QuickPlace. The default Place type defines the structure of all QuickPlaces on the server if no user-created Place types exist on that server.

Editing the Description of a Place Type

One can edit the description 494 of an existing Place type; specify a new image file 496 to display next to the Place type name that appears when a user clicks Create a QuickPlace; and change the link 498 users can click to display a detailed description of the Place type. The description of the default Place type QuickPlace installs on the QuickPlace server cannot be edited.

1. In the Address or Location box in the browser, enter the address of the QuickPlace server.
2. Click SignIn in the top right corner of the QuickPlace window.
3. Enter the user name and password used when QuickPlace was first installed on the server.
4. Click Place types in the sidebar.
5. In the list of Place type names on the screen, click the name of the Place type for which to create a new description.
6. Click Edit.
7. Click "No, simply update the information below."
8. Make one or more of the following changes: change the text description for the Place type; add an image to the Place type description or replace an existing image; enter the address of a Web page that describes the Place type in more detail or change the existing address.
9. Click Next.

Hiding and Redisplaying Place Type Names

One can hide the name of a Place type in the list of Place types users see when they click Create a QuickPlace, for example, if experimenting with the contents of the Place type and not yet ready to make it available to QuickPlace creators. The word "hidden" appears next to the name of the Place type in the list of Place types seen as the QuickPlace server administrator.

1. In the Address or Location box in the browser, enter the address of the QuickPlace server.
2. Click SignIn in the top right corner of the QuickPlace window.
3. Enter the user name and password used when QuickPlace was first installed on the server.
4. Click Place types in the sidebar.
5. Click Show/Hide.
6. Do one of the following: to hide the name of a Place type in the list, remove the checkmark next to the name of that Place type; or to display the name of a Place type in the list, check the box next to the name of that Place type.
7. Click Next.

Updating a Place Type

If the manager of a QuickPlace on which a Place type is based changes that QuickPlace—for example, by adding a room to the QuickPlace—the Place type can be updated to reflect those changes.

1. In the Address or Location box in the browser, enter the address of the QuickPlace server.
2. Click SignIn in the top right corner of the QuickPlace window.
3. Enter the user name and password used when QuickPlace was first installed.
4. Click Place types in the sidebar.
5. Click the name of the Place type to update.
6. Click Edit.
7. Click "Yes, copy changes and update the information below."
8. Click Next.

Copying a Place Type from One Server to Another

One can use operating system commands to copy a Place type from one QuickPlace server to another. A Place type consists of a set of Notes database files (.NSF files) in a subdirectory of the AreaTypes subdirectory on the QuickPlace server. Suppose, for example, QuickPlace is installed on drive C together with a Place type called Rapid Response. The NSF files for Rapid Response would be stored in one of the following locations, depending on the type of QuickPlace installation:

In c:\QuickPlace\data\QuickPlace\AreaTypes\Rapid Response, if the server is a standalone QuickPlace server In c:\Lotus\Domino\data\QuickPlace\AreaTypes\Rapid Response, if QuickPlace is installed on a Domino server To copy a Place type from one QuickPlace server (server A) to another QuickPlace server (server B):

1. On server B, create a subdirectory for the Place type in x:\QuickPlace\data\QuickPlace\AreaTypes (if the server is a standalone QuickPlace server) or x:\Lotus\Domino\data\QuickPlace\AreaTypes (if the server is running both Domino and QuickPlace), where x is the drive on which QuickPlace is installed.

For example, to copy a Place type called Design Issues to server B, a standalone QuickPlace server, one would create subdirectory x:\QuickPlace\data\QuickPlace\AreaTypes\Design Issues, where x is the drive on which QuickPlace is installed.

2. Locate the Place type files to copy and copy them from server A to the subdirectory created on server B.
3. Use the procedure outlined in the next section to add the Place type copied to the second QuickPlace server to the list of Place types seen when one signs onto that second QuickPlace server as the server administrator.

Adding a Place Type Copied from Another Server to the List of Place Types on the Current Server If operating system commands have been used to copy files for a Place type to the Place types directory on the current QuickPlace server, that new Place type can be added to the list of Place types on the current server. One sees the list of Place types upon signing into the current server as the server administrator and clicking Place types in the sidebar. The new Place type also becomes available to QuickPlace creators until or unless the name of the Place type is hidden.

Add a Place type copied from another server to the list of Place types on the current server, as follows:

1. In the Address or Location box in your browser, enter the address of the QuickPlace server.
2. Click SignIn in the top right corner of the QuickPlace window.
3. Enter the user name and password used when QuickPlace was first installed.
4. Click Place types in the sidebar.
5. Click Refresh List.

Deleting a Place Type

When one deletes a Place type, QuickPlace deletes the Place type from the QuickPlace server and removes the name of the Place type in the following places: in the list seen when a user signs into the current server as the server administrator and click Place types; in the list a QuickPlace creator sees when he or she clicks Create a QuickPlace. One cannot delete the default Place type.

Advantages Over the Prior Art

It is an advantage of the invention that there is provided a collaboration space application model for creating web applications that are aesthetically pleasing and present the user with a simple interface.

It is further advantage of the invention that there is provided a method and system for creating web applications that are instantly created, instantly archived, team and project oriented, easy to use, created, accessed and administered via the Web, reusable, and extensible.

It is a further advantage of the invention that there is provided a method and system for creating a place in collaboration space by creating a first place; and saving the first place as a place type template from which other places may be created in collaboration space having the same look and feel.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for creating a place type from which new places are created in collaboration space, comprising the steps of:

creating a first place including a configuration specifying members and their respective roles, a data structure including at least one room form and included page form, and at least one skin group for a team project;

rendering said first place as an existing place;

responsive to user command, saving said existing place as a place type from which other places are to be created with said configuration in said collaboration space;

rendering a new place as a copy of said place type, said new place being a fully functioning collaborative space including members with specific roles, data structure including folders and rooms and created by said place type from said existing place;

responsive to place manager selection:

selectively preventing changes to look and feel of said new place by not presenting decorate options in said place type;

selectively displaying a description of said place type;

displaying source information for said place type, including name and address of collaboration space place on which said place type is based;

selectively hiding and redisplaying names and descriptions of place types in a list of available place types created by place type authors and transportable among plurality of servers;

selectively updating said new place created using said place type when said place type changes; and selectively copying said place type from a server on which said place type was created to another server.

2. The method of claim 1, further comprising the steps of:

responsive to a user selecting an action from a browser user interface for creating a place in collaboration space, displaying a list of custom place types;

receiving from said user a name of a custom place type from said list, together with a name for a new place, user name and password; and responsive to verification of said user as authorized by user name and password, creating a new place from said custom place type.

3. The method of claim 1, further comprising the steps of:

organizing said collaboration space according to an object model selectively including place, room, folder, page, member, form, field, place type, room type, skin, and placebot objects.

4. The method of claim 3, said place type being implemented as a directory within said room type.

5. The method of claim 1, further comprising the step of:

manipulating functionality provided by said place type to customize said collaboration space by integrating external technology.

6. The method of claim 1, further comprising the steps of:

granting authority to an authorized user to access said place type and create a new place from said place type; and responsive to a request from said authorized user, modifying said new place.

7. The method of claim 6, further comprising the step of:

updating said new place created using said place type when said place type is modified.

8. The method of claim 6, further comprising the step of:

responsive to a "what's new" request entered by a user, displaying at said browser changes made to said place type.

9. The method of claim 1, further comprising the step of:

responsive to creation of said place type from said first place, using said place type as a custom place type for creating said other places having the format, look and feel of said first place.

10. The method of claim 9, further comprising the step of:

including membership, forms, placebots and skins defining a collaboration space place within said place type.

11. A method for creating a plurality of place type place types from which new places are to be created in collaboration space, comprising the steps of:

creating a first place;

rendering said first place in collaboration space;

saving said first place as a place type;

creating a new place as a copy of said place type, said new place being a fully functioning collaborative space;

rendering said new place in collaboration space; and responsive to place manager selection:

selectively preventing changes to look and feel of said new place by not presenting decorate options in said place type;

selectively displaying a description of said place type;

displaying source information for said place type, including name and address of collaboration space place on which said place type is based;

selectively hiding and redisplaying names and descriptions of place types in a list of available place types created by place type authors and transportable among plurality of servers;

selectively updating said new place created using said place type when said place type changes; and selectively copying said place type from a server on which said place type was created to another server.

12. A system for creating a place type from which new places are to be created in collaboration space comprising:

a first place;

said first place including a configuration of membership, at least one room form and included page form, and at least one skin group for a team project;

said skin group defining a page read display mode, a page edit display mode, a folder list and response display mode, and a folder headline display mode;

said place type created responsive to user command from a preexisting first place; each said new place created as a copy of said place type and having said configuration within said collaboration space as a fully functioning collaboration space including members with specific roles, data structure including folders and rooms, copied from said first place;

means responsive to place manager selection for:

selectively preventing changes to look and feel of said new place by not presenting decorate options in said place type;

selectively displaying a description of said place type;

displaying source information for said place type, including name and address of collaboration space place on which said place type is based;

selectively hiding and redisplaying names and descriptions of place types in a list of available place types created by place type authors and transportable among a plurality of servers;

selectively updating said new place created using said place type when said place type changes; and selectively copying said place type from a server on which said place type was created to another server.

13. The system of claim 12, said collaboration space being organized according to an object model including place, room, folder, page, member, form, field, place type, room type, skin, and placebot objects.

14. The system of claim 13, said place type being a directory containing all rooms comprising said place type.

15. The system of claim 14, said place type including membership, forms, placebots and skins.

16. The system of claim 13, further comprising:

a browser for manipulating functionality provided by said place type to customize said collaboration space by integrating external technology.

17. The system of claim 12, further comprising:

a browser for manipulating functionality provided by said place type.

18. A program storage device readable by a machine, tangibly embodying a program of instructions executable by a machine to perform method steps for creating a place type from which new places are created in collaboration space, said method steps comprising:

creating a first place including a configuration of members and their respective roles, and a data structure including at least one room form and included page form, and at least one skin group for a team project;

rendering said first place as an existing place;

responsive to user command, creating from said existing place a place type specifying collaborative space characteristics including a members list and roles, data structure, of said first place; and creating as a copy of said place type a new place as a fully functioning collaboration place including said configuration of members and their respective roles and said data structures;

responsive to place manager selection:

selectively preventing changes to look and feel of said new place by not presenting decorate options in said place type;

selectively displaying a description of said place type;

displaying source information for said place type, including name and address of collaboration space place on which said place type is based;

selectively hiding and redisplaying names and descriptions of place types in a list of available place types created by place type authors and transportable among plurality of servers;

selectively update said new place created using said place type when said place type changes; and selectively copying said place type from a server on which said place type was created to another server.

19. The program storage device of claim 18, said method steps further comprising:

responsive to a user selecting an action from a browser user interface for creating a place in collaboration space, displaying a list of custom place types;

receiving from said user a name of a custom place type from said list, together with a name for a new place, user name and password; and responsive to verification of said user as authorized by user name and password, creating a new place from said custom place type as a fully functioning collaboration space.

* * * * *